United States Patent [19]
Nagahama

[11] Patent Number: 5,636,277
[45] Date of Patent: Jun. 3, 1997

[54] SYSTEM FOR LICENSING TO USE SOFTWARE PRODUCTS

[75] Inventor: Eiichi Nagahama, Kawasaki, Japan

[73] Assignee: Fujitsu Limited, Japan

[21] Appl. No.: 535,615

[22] Filed: Sep. 28, 1995

[30]   Foreign Application Priority Data

Sep. 30, 1994  [JP]  Japan ................................. 6-238060

[51] Int. Cl.[6] ........................................................ H04L 9/00
[52] U.S. Cl. ................................. 380/4; 380/21; 380/25
[58] Field of Search .......................... 380/3, 4, 23, 24, 380/25, 49, 46, 21

[56]   References Cited

U.S. PATENT DOCUMENTS

| | | | |
|---|---|---|---|
| 5,490,216 | 2/1996 | Richardson | 380/4 |
| 5,509,070 | 4/1996 | Schull | 380/4 |
| 5,548,645 | 8/1996 | Ananda | 380/4 |
| 5,586,186 | 12/1996 | Yuval et al. | 380/25 |

*Primary Examiner*—David C. Cain
*Attorney, Agent, or Firm*—Staas & Halsey

[57]   ABSTRACT

A system for licensing to use software products which are encrypted and packed in a single storage medium, whereby the encrypted software products can be sold on a piece-by-piece basis and it is possible to perform accounting operations and collection of sales records with accuracy in a stepwise manner for each shop related thereto. A plurality of software products are encrypted and stored in a product-medium and delivered to an end-user. At the same time, sales-medium creating means creates a sales-medium which contains product information and shop information and distributes it to wholesalers and then to retailers. Upon reception of an order and its payment from the end-user, key generating means extracts keys from the sales-medium and provides the end-user with the keys or complex keys derived therefrom, thereby allowing the end-user to decrypt the software products and make them executable. Accounting means updates the sales records by each sales transaction, and calculates the sales track records at every month-end based on the sales-media in the retailers and wholesalers in a stepwise manner.

15 Claims, 16 Drawing Sheets

| PRODUCT NAME | KEY | SALES |
|---|---|---|
| PRODUCT NAME #1 | KEY #1 | 0 |
| PRODUCT NAME #2 | KEY #2 | 0 |
| ⋮ | ⋮ | ⋮ |
| PRODUCT NAME #N | KEY #N | 0 |

221b

| SHOP ID |
|---|
| #001 |

221c

| MEDIUM CREATING MEANS |
|---|
| ACCOUNTING MEANS |
| KEY GENERATING MEANS |

| PRODUCT NAME | KEY | SALES |
|---|---|---|
| PRODUCT NAME #1 | KEY #1 | 0 |
| PRODUCT NAME #2 | KEY #2 | 0 |
| ⋮ | ⋮ | ⋮ |
| PRODUCT NAME #N | KEY #N | 0 |

231b

| SHOP ID |
|---|
| #011 |

231c

| KEY GENERATING MEANS |
|---|
| ACCOUNTING MEANS |

FIG. 6(B)

MEDIUM ID #1 — 221

- ACCOUNTING INFORMATION EXTRACTION PROGRAM
- SALES-MEDIUM CREATING PROGRAM
- KEY GENERATION AND ACCOUNTING PROGRAM
- KEY INFORMATION FILE
- PRODUCT SALES RECORD FILE
- SALES-MEDIUM ID FILE

> RETAILER NAME #1 : MEDIUM ID #3
> RETAILER NAME #2 : MEDIUM ID #4

FIG. 6(C)

MEDIUM ID #4 — 231b

MEDIUM ID #3 — 231a

- KEY GENERATION AND ACCOUNTING PROGRAM
- KEY INFORMATION FILE
- PRODUCT SALES RECORD FILE

MEDIUM ID #1
- ACCOUNTING INFORMATION EXTRACTION PROGRAM
- SALES-MEDIUM CREATING PROGRAM
- KEY GENERATION AND ACCOUNTING PROGRAM
- KEY INFORMATION FILE
- PRODUCT SALES RECORD FILE
- SALES-MEDIUM ID FILE

RETAILER NAME #1 : MEDIUM ID #3
  RETAILER NAME #2 : MEDIUM ID #4

MEDIUM ID #4
MEDIUM ID #3
- KEY GENERATION AND ACCOUNTING PROGRAM
- KEY INFORMATION FILE
- PRODUCT SALES RECORD FILE

MEDIUM ID #3
MEDIUM ID #3
- ENCRYPTED S/W PRODUCT #1
- ENCRYPTED S/W PRODUCT #2

322b

MEDIUM ID #4
MEDIUM ID #4
- ENCRYPTED S/W PRODUCT #1
- ENCRYPTED S/W PRODUCT #2

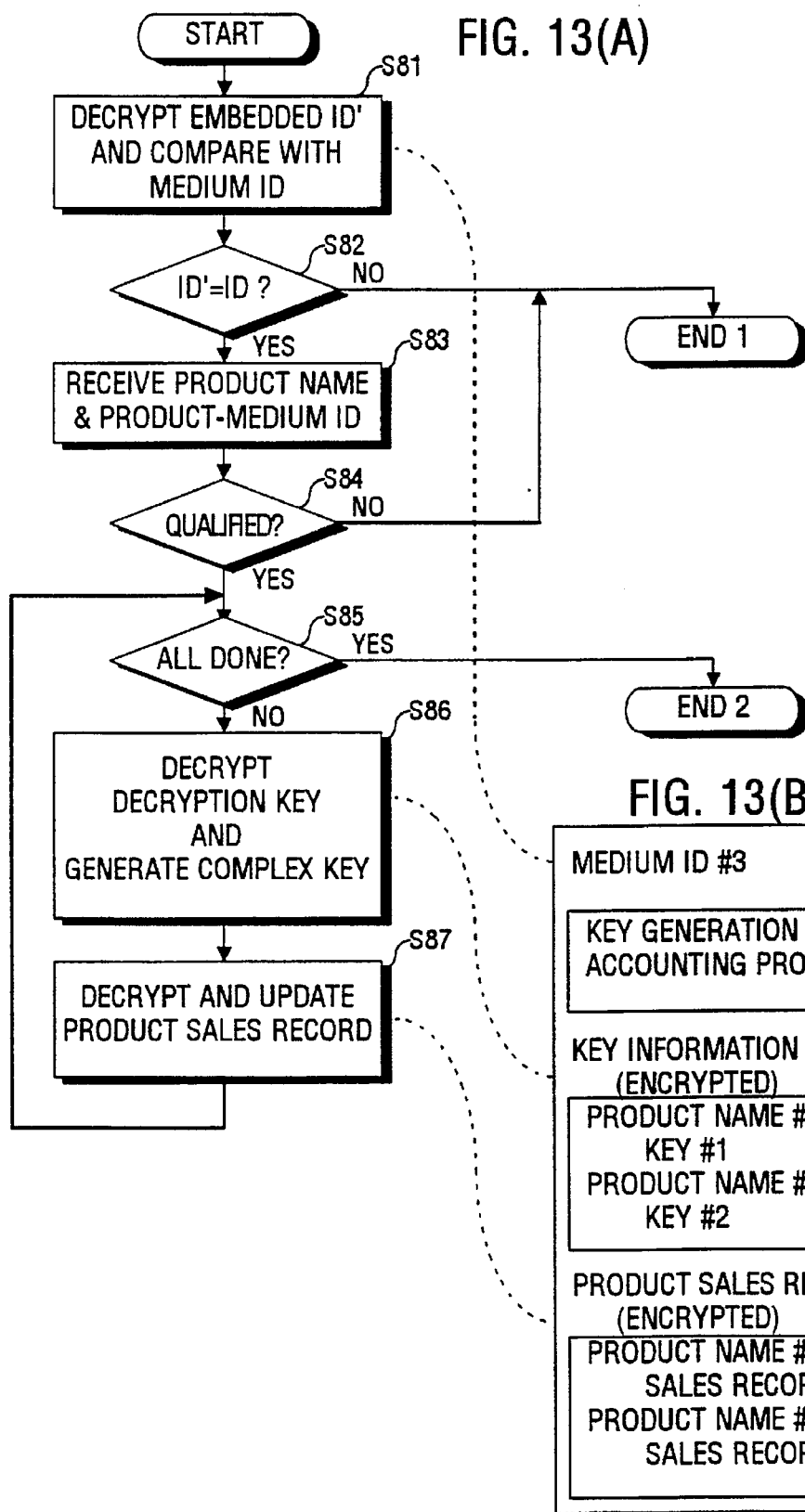

SYSTEM FOR LICENSING TO USE SOFTWARE PRODUCTS

BACKGROUND OF THE INVENTION

1. Field of the Invention

The present invention relates to a system for licensing to use software products, and more specifically, to a system for licensing to use software products which are encrypted and packed in a single storage medium.

2. Description of the Related Art

Today's high-capacity storage media such as CD-ROM and MO (Magneto-Optical) disk allow software vendors to provide end-users with many software products packed into a single disk. The software vendors encrypt those software products with qualified encryption keys before writing them into the disk. Although the end-users can get such a disk easily, they are not immediately allowed to use the software products because they are still encrypted. The end-users are required to choose their preferable software products among those in the disk and purchase them, and in exchange for the payment, they receive some keys to decrypt the purchased software products and make them usable. Namely, the end-users are now licensed to use the software products.

The above-described sales system will be more specifically described as follows with reference to FIG. 14 which shows a conventional system for licensing to use software products.

In FIG. 14, a software vendor 410 is defined as a prime wholesaler which solely distributes the software products. This software vendor (wholesaler #0) 410 packs a plurality of encrypted software products into CD-ROMs 411 and supplies them to a wholesaler #1 420 as indicated by [1]. This wholesaler #1 420 is one of the wholesalers which deal with the software vendor 410.

The wholesaler #1 420 distributes the CD-ROMs 411 to some retailers which are among the downstream shops organized by the wholesaler #1 420. A retailer 430, one of such retailers, is supplied with the CD-ROMs 411 as indicated by [2].

An end-user 440 gets one of such CD-ROMs 411 from the retailer 430 as shown as [3] and picks up some software products of her or his choice, which are still encrypted.

The end-user 440 then calls a decryption key provider 450 as indicated by [4] and orders the desired products to them. The decryption key provider 450 provides the end-user 440 with the decryption keys [5] in exchange for the payment. Now the end-user 440 can extract the purchased software products from the CD-ROM 411 by using the decryption keys and convert them to executable programs.

The decryption key provider 450 distributes the profits to the retailer 430 and the wholesaler #1 420 and also pays to the software vendor (prime wholesaler #0) 410 as arrows [6] show.

Such a conventional sales system, however, has the following problems.

(1) The retailers are unable to know promptly what software products were sold to the end-users, since the end-users directly contact the decryption key provider and get the keys from them in exchange for the payment.

(2) The retailers are not allowed to set retail prices for the products based on their own pricing strategy.

(3) In order to share the profits, it is necessary to trace what sales channels were actually used in each trade. Inaccuracies of such information could cause a trouble with the profit distribution.

(4) The decryption key provider will grasp all the business information related to the shops and end-users.

SUMMARY OF THE INVENTION

Taking the above into consideration, an object of the present invention is to provide a system for licensing to use software products, thereby enabling sales of encrypted software products on a piece-by-piece basis as well as accounting operations and collection of sales records with accuracy in a stepwise manner for each shop related thereto.

To accomplish the above object, according to the present invention, there is provided a system for licensing to use software products which are encrypted by a software vendor. The system comprises a first supplier unit for supplying a product-medium which contains a plurality of encrypted software products and a sales-medium, and a second supplier unit for supplying a key to decrypt one of the encrypted software products.

The first supplier unit comprises information storage means for storing key information and sales-medium creating means for creating the sales-medium which contains the key information stored in the information storage means.

The second supplier unit comprises key generating means for generating the key based on the key information which is supplied in the sales-medium.

According to the present invention, there is provided another system for licensing to use software products. The system comprises a software vendor unit, a wholesaler unit, and a retailer unit.

The software vendor unit supplies a product-medium which contains a plurality of software products being encrypted as well as supplying a wholesaler's sales-medium. The software vendor unit comprises vendor information storage means to store product information and wholesaler's name. It further comprises wholesaler's sales-medium creating means for creating the wholesaler's sales-medium based on the product information and the wholesaler's name stored in the information storage means.

The wholesaler unit supplies a retailer's sales-medium which contains the product information and retailer's name, based on the wholesaler's sales-medium provided by the software vendor unit.

The retailer unit supplies an end-user with a key to decrypt one of the encrypted software products. The retailer unit comprises key generating means for generating the key based on the product information stored in the retailer's sales-medium.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4(A) illustrates contents of a wholesaler's sales-medium;

FIG. 4(B) illustrates contents of a retailer's sales-medium;

FIG. 6(B) illustrates a wholesaler's MO disk;

FIG. 6(C) illustrates a retailer's MO disk;

FIG. 12(B) illustrates a wholesaler's MO disk;

FIG. 12(C) illustrates a retailer's MO disk;

FIG. 12(D) illustrates a product-medium to be sold by retailers;

FIG. 13(A) is a flow chart showing a process to generate complex keys and record sales transactions;

FIG. 13(B) illustrates the detailed contents of a retailer's MO disk; and

DESCRIPTION OF THE PREFERRED EMBODIMENTS

Embodiments of the present invention will be described below with reference to the drawings.

Figure 1:
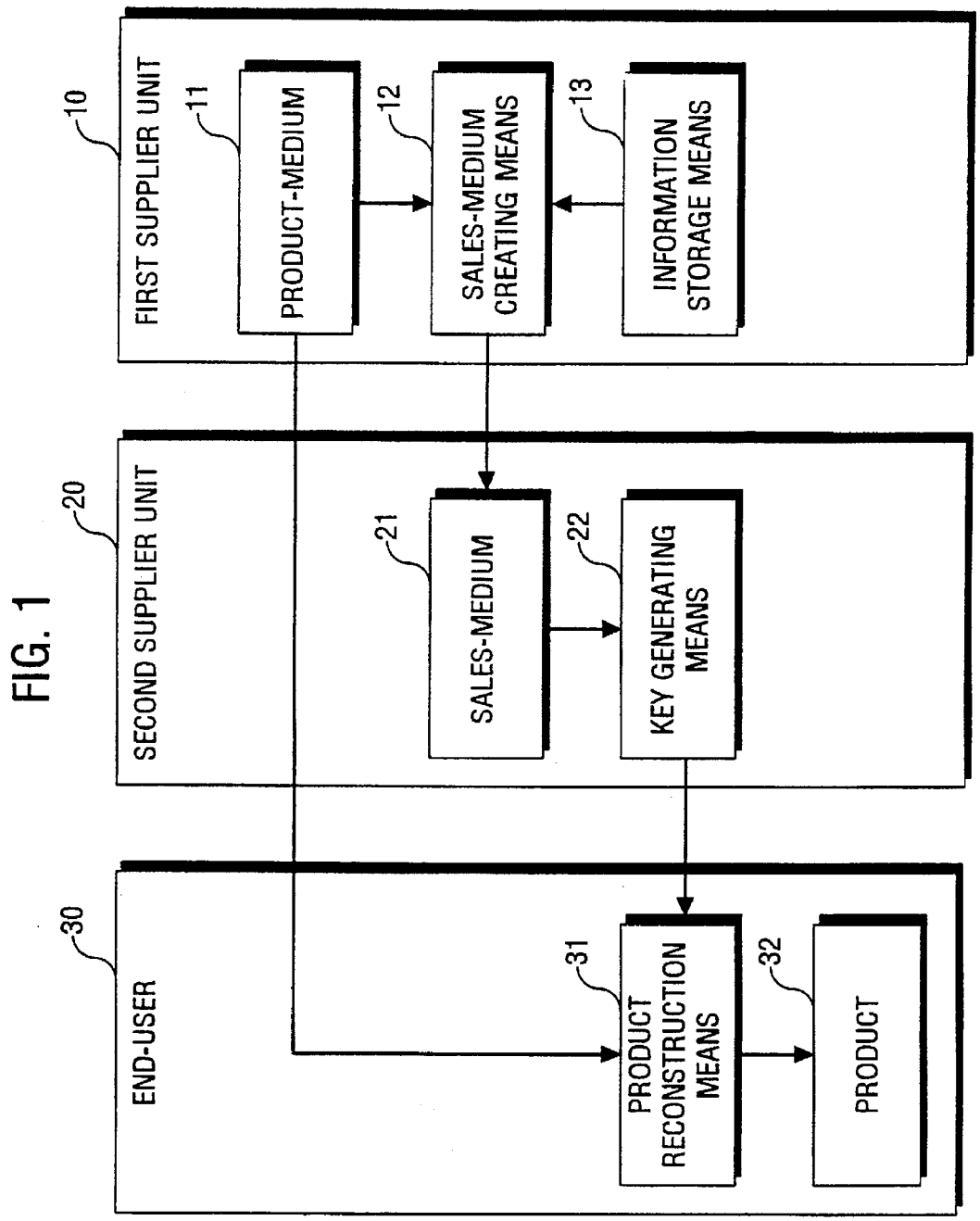
FIG. 1 is a first conceptual view of a system for licensing to use software products according to the present invention.

FIG. 1 is a first conceptual view of a system for licensing to use software products according to the present invention.

This licensing system comprises a first supplier unit 10 and a second supplier unit 20. The first supplier unit 10 is a subsystem which supplies the second supplier unit 20 with a product-medium 11 containing encrypted software products. The first supplier unit 10 comprises sales-medium creating means 12 for creating a sales-medium 21 for use in the second supplier unit 20.

The product-medium 11 is a medium which stores a plurality of encrypted software products to be supplied to an end-user 30, or licensee, via the second supplier unit 20. On the other hand, the sales-medium 21 is a medium which stores various information that will help the sales operations such as product information, shop information and software tools.

The second supplier unit 20 is a subsystem which comprises key generating means 22 for generating a key to decrypt the encrypted software products stored in the product-medium 11.

Operation of this system is as follows. The sales-medium creating means 12 in the first supplier unit 10 creates the sales-medium 21 which contains the product information related to the software products in the product-medium 11, and provides it to the key generating means 22 in the second supplier unit 20. The end-user 30, who has been supplied with the product-medium 11, chooses and purchases a software product being encrypted therein. In the second supplier unit 20, the key generating means 22 generates a key for decrypting the purchased product according to the contents of the sales-medium 21 supplied from the first supplier unit 10. The second supplier unit 20 supplies the key to the end-user 30. Supplied with the decryption key, the end-user 30 extracts and decrypts the software product in the product-medium 11 using a product reconstruction means 31, thus obtaining a product 32, namely, the software product decrypted to an executable form.

Figure 2:
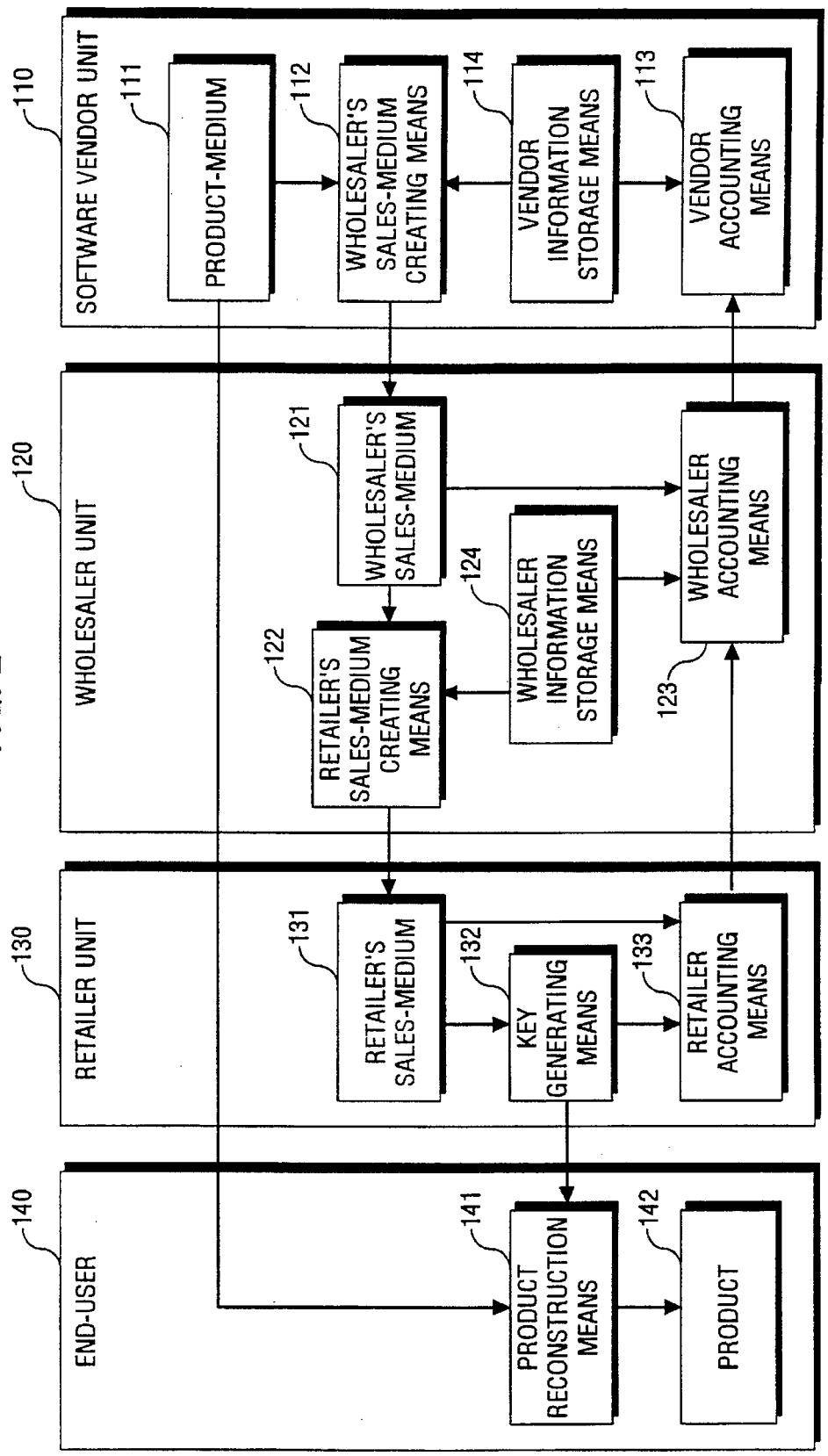
FIG. 2 is a second conceptual view of a system for licensing to use software products according to the present invention.

FIG. 2 is a second conceptual view of a system for licensing to use software products according to the present invention.

This licensing system consists of a software vendor unit 110, a wholesaler unit 120 and a retailer unit 130. An end-user 140 is to be a licensee.

As described in the first conceptual view in FIG. 1, a product-medium 111 containing a plurality of encrypted software products is supplied to the end-user 140 from the software vendor unit 110 via the wholesaler unit 120 and the retailer unit 130.

The software vendor unit 110 comprises wholesaler's sales-medium creating means 112 for creating a wholesaler's sales-medium 121 based on information stored in vendor information storage means 114, and also comprises vendor accounting means 113 for summing up wholesaler's sales records provided from the wholesaler unit 120.

The wholesaler unit 120 comprises retailer's sales-medium creating means 122 for creating a retailer's sales-medium 131 based on the wholesaler's sales-medium 121 and information stored in a wholesaler information storage means 124. The wholesaler unit 120 further comprises wholesaler accounting means 123 for summing up retailer's sales records and reporting the wholesaler's sales records to the software vendor unit 110.

The retailer unit 130 comprises key generating means 132 for generating a key to decrypt the encrypted software product in the product-medium 111 and retailer accounting means 133 for summing up sales records of the software products and reporting the retailer's sales records to the wholesaler unit 120.

Operation of this system is as follows.

Based on the contents of the vendor information storage means 114, the sales-medium creating means 112 in the software vendor unit 110 creates the sales-medium 121 which contains product information and shop information and provides it to the wholesaler unit 120.

The product information is various data related to the encrypted software products contained in the product-medium 111, and it includes information such as product names, keys for decrypting the software products, and sales records. The keys and sales records are to be encrypted.

The shop information is information to identify the wholesaler unit which will receive the wholesaler's sales-medium 121, and it is provided by the vendor information storage means 114 which stores a list of affiliated wholesalers of the software vendor unit 110.

Based on the contents of the wholesaler's sales-medium 121 as well as the wholesaler information storage means 124, the retailer's sales-medium creating means 122 in the wholesale unit 120 creates the retailer's sales-medium 131.

The retailer's sales-medium 131 contains the same product information as that in the wholesaler's sales-medium 121 and the shop information which identifies the retailer unit 130.

The end-user 140, who has been supplied with the product-medium 111, informs the retailer unit 130 of the name (or product identifier) of a product to be purchased. In the retailer unit 130, the key generating means 132 extracts a key for decryption of the purchased product from the retailer's sales-medium 131 supplied from the wholesaler unit 120, and supplies the key to the end-user 140. (Before the key reaches the end-user 140, there is an optional qualification procedure to be described later on.) At the same time, the retailer accounting means 133 updates the sales record of the sold product in the retailer's sales-medium 131 to record that commercial transaction.

Supplied with the decryption key, the end-user 140 extracts and decrypts the software product in the product-medium 111 using a product reconstruction means 141, thus obtaining a product 142, namely, the software product decrypted to an executable form.

The retailer accounting means 133 and the wholesaler accounting means 123 periodically, say monthly, report their sales track records to the wholesaler unit 120 and the software vendor unit 110, respectively. First, the retailer accounting means 133 sends retailer's sales records to the wholesaler 120, which describe its monthly sales track records. Second, The wholesaler accounting means 123 sums up such records sent from its affiliated retailers and reports them as the wholesaler's sales records to the software vendor unit 110. Lastly, the vendor accounting means 113 sums up such reports from its affiliated wholesalers, thus grasping the total sales achievement of the month.

According to the present invention, the key generating means 132 is configured so that it requires an input of a product identifier in prior to generation of the key.

In addition to the input of the product identifier, the key generating means 132 can be configured so that it requires an input of a medium identifier in prior to generation of the key, which identifies the medium which stores the products. The medium identifier is used to generate a complex key which is to be supplied to the end-user 140. Before decrypting the purchased product, the end-user 140 should extract a decryption key from the complex key by inputting the medium identifier to qualify himself/herself to use the decryption key. (This manual input operation of the medium identifier may be replaced with an automatic recognition technique.) With thereby extracted decryption key, the end-user 140 extracts and decrypts the purchased software product in the product-medium 111.

There is provided another configuration of the key generating means 132 such that, in addition to the product identifier, it requires an input of a user-unit identifier in prior to generation of the key, that identifies the user's unit (i.e., the user's computer system) on which the purchased software products will run. The user-unit identifier is used to generate a complex key and to extract the decryption key from the complex key in the same way as how the medium identifier is used.

There is provided still another configuration of the key generating means 132 such that it requires an input of a system-user identifier in prior to generation of the key, that identifies the user of this licensing system. The system-user identifier (e.g., a retailer's ID code) is used to generate a complex key and to extract the decryption key from the complex key in the same way as how the medium identifier or the user-unit identifier is used.

Next, the following will explain a first embodiment of the present invention which specifically embodies the structural arrangement shown in the second conceptual view in FIG. 2. The drawings related to this are FIGS. 3 through 8(B).

Figure 3:
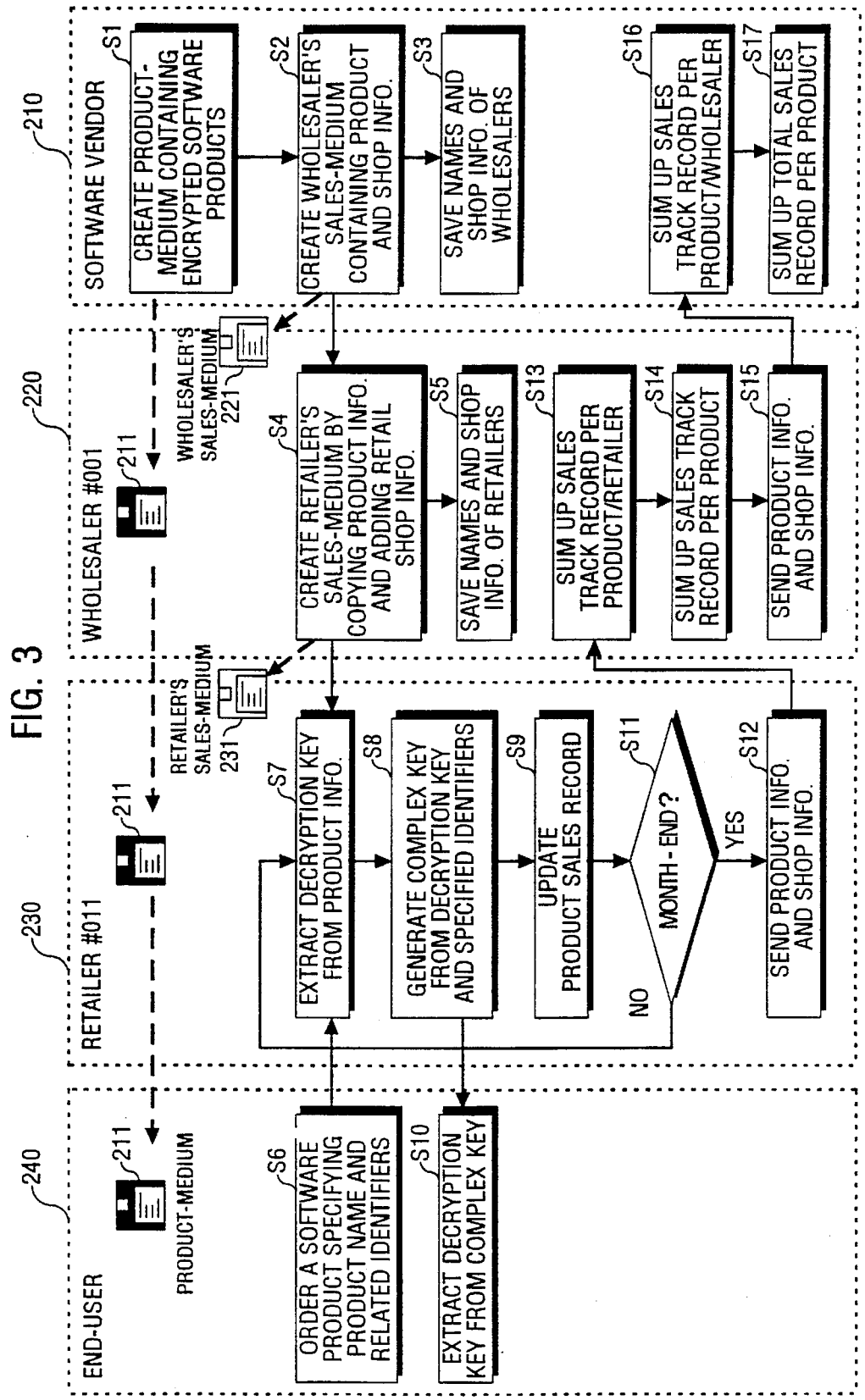
FIG. 3 shows a total process flow of a first embodiment.

FIG. 3 shows a system for licensing to use software products of the first embodiment. The system in reality involves a plurality of wholesalers, retailers and end-users, however, for the purpose of illustration, those plural roles are represented by a wholesaler 220, a retailer 230 and an end-user 240, respectively. Also for a plurality of storage media to store the software products, a single product-medium 211 represents them in FIG. 3.

A software vendor 210 actually is a software producer or a prime wholesaler which may have the exclusive right to sell the software products on behalf of the software producer. Being supplied with a product-medium 211 from this software vendor 210, the wholesaler 220 having a shop number #001 distributes it to the retailer 230. The retailer 230, which has a shop number #011, then supplies to the end-user 240 with the product-media and also provides decryption keys in response to the purchase orders from the end-users in exchange for the payment from them.

FIG. 3 explains the total process flow of the first embodiment in a stepwise manner with reference to the following steps S1 through S17.

[Step S1]

The software vendor encrypts a plurality of software products and packs those encrypted products into a product-medium 211. A CD-ROM or MO disk can be used for this product-medium 211. If required, a medium number is also embedded into the product-medium 211. The product-medium 211 thus created is sold to the end-user 240 via the wholesaler 220 and the retailer 230.

[Step S2]

Separately from the product-medium 211, the software vendor writes product information and shop information into a wholesaler's sales-medium 221 so as to provide data and tools for sales of the software products in the product-medium 211. The product information contains product names, decryption keys and sales record, and the shop information contains a wholesaler's identifier #001 as shown in FIG. 4(A). The sales-medium also contains programs for medium creating means, summing-up means and key generating means.

[Step S3]

After creating the wholesaler's sales-medium 221, the software vendor 210 saves the name of wholesaler and the shop information for later use.

[Step S4]

Supplied with the wholesaler's sales-medium 221 from the software vendor 210, the wholesaler (#001) 220 copies the product information to a retailer's sales-medium 231 and then adds information concerning the downstream shops (i.e., retailers) to it.

[Step S5]

The wholesaler #001 saves the name of the retailer and the shop information for later use.

[Step S6]

The end-user 240 places an order for a product of his/her choice to the retailer 230 by informing them of its product name as well as the medium identifier of the product-medium, the user-unit identifier, or the system-user identifier.

[Step S7]

Out of the product information stored in the sales-medium 231, the retailer 230 extracts a key associated with the product name that the end-user 240 has specified.

[Step S8]

The retailer 230 then generates a complex key from the key extracted in Step S7 and the identifiers informed from the end-user 240 (i.e., medium identifier, user-unit identifier, or system-user identifier), and supplies the complex key to the end-user 240.

[Step S9]

The sales record in the product information stored in the product-medium 211 is increased by one for summing up the sales track record.

[Step S10]

The end-user 240 extracts the decryption key from the complex key by using the medium identifier, user-unit identifier, or system-user identifier. This decryption key allows the end-user 240 to decrypt the software product in the product-medium 211 back to the original and usable form.

[Step S11]

At the retailer 230, the date is checked whether it is or not the day for month-end accounting. If it is not the day, it returns to Step S7 and waits for the next transaction.

[Step S12]

If it is the day, the product information and the shop information stored in the retailer's sales-medium 231 are sent on-line to the wholesaler 220 as a month-end report (or the retailer's sales-medium 231 is sent back to the wholesaler 220).

[Step S13]

The sales track record per product/retailer is calculated and reported on a monthly basis. That is, the accounting means in the wholesaler's sales-medium 221 sums up the number of sold products and reports details of how many and what product was sold at which retail shop.

[Step S14]

The sales track record of each product for all the retail shops is calculated and reported. That is, the accounting means further calculates the total sales of each product for all the retail shops based on the sales track record product/retailer calculated in Step S13.

[Step S15]

The wholesaler 220 sends the product information as well as the shop information to the software vendor. That is, the product information updated with the sales track record obtained in Step S14 and the shop information of the wholesaler 220 are sent on-line to the software vendor (or the wholesaler's sales-medium 221 is sent back to the software vendor 210).

[Step S16]

At the software vendor 210, the sales track record per product/wholesaler is calculated and reported on a monthly basis. That is, the accounting means sums up the number of sold products based on the product information and the shop information reported from the wholesaler 220 in Step 15.

[Step S17]

The total sales track record of each product for all the wholesalers is calculated and reported. That is, the summing-up means further calculates the total sales of each product at all the wholesalers based on the sales track record per product/wholesaler calculated in Step S16.

As described above in Steps S1 to S17, the system of the first embodiment allows the software vendor to distribute the sales information and tools by creating and sending the sales-medium to its downstream shops in a stepwise manner. The system also allows each retailer to provide decryption keys to end-users and to record and report the monthly sales automatically.

Next, the details of the wholesaler's sales-medium 221 and the retailer's sales-medium 231 will be described below with reference to FIGS. 4(A) and 4(B).

FIG. 4(A) illustrates contents of a wholesaler's sales-medium, which includes product information 221a, shop information 221b, and software tools 221c.

The product information 221a contains product names, keys, and sales records. The product names are identifiers to represent the names of encrypted software products. The keys are used for decryption of respective encrypted software products and each key is actually expressed as a sequence of numerals with a predetermined length, which sequence conforms to some standards such as the DES (Data Encryption Standard). The sales records, which are initialized to zeros as seen in FIG. 4(A), will be used to sum up the number of sold products.

FIG. 4(A) also illustrates the shop information 221b which contains the wholesaler's identifier #001. The shop information is defined as an identifier of the downstream shop that will use that sales-medium.

The software tools 221c consist of some programs which will serve as the medium creating means, the accounting means, and the key generating means, although the last one is not actually used in the wholesalers.

As described above, the software vendor creates the wholesaler's sales-medium which includes the product information 221a, the shop information 221b, the programs for the medium creating means, the accounting means, and the key generating means. The software vendor creates such a sales-medium for every wholesaler.

FIG. 4(B) illustrates contents of a retailer's sales-medium 231, which includes product information 231a, shop information 231b, and software tools 231c, just as FIG. 4(A).

The product information 231a is simply obtained by copying the product information 221a in the wholesaler's sales-medium 221, and therefore, they are identical to each other.

The shop information 231b contains the retailer's identifier #011 to be used to know which shop the specific sales-medium is assigned for.

The software tools 231c consist of some programs including at least accounting means and key generating means as shown in FIG. 4(B).

As described above, the wholesaler 220 creates the retailer's sales-medium 231 by copying the product information, the programs for the accounting means and the key generating means, and then adding the shop information of the retailer. The wholesaler 220 supplies this sales-medium to every retailer.

Figure 5:
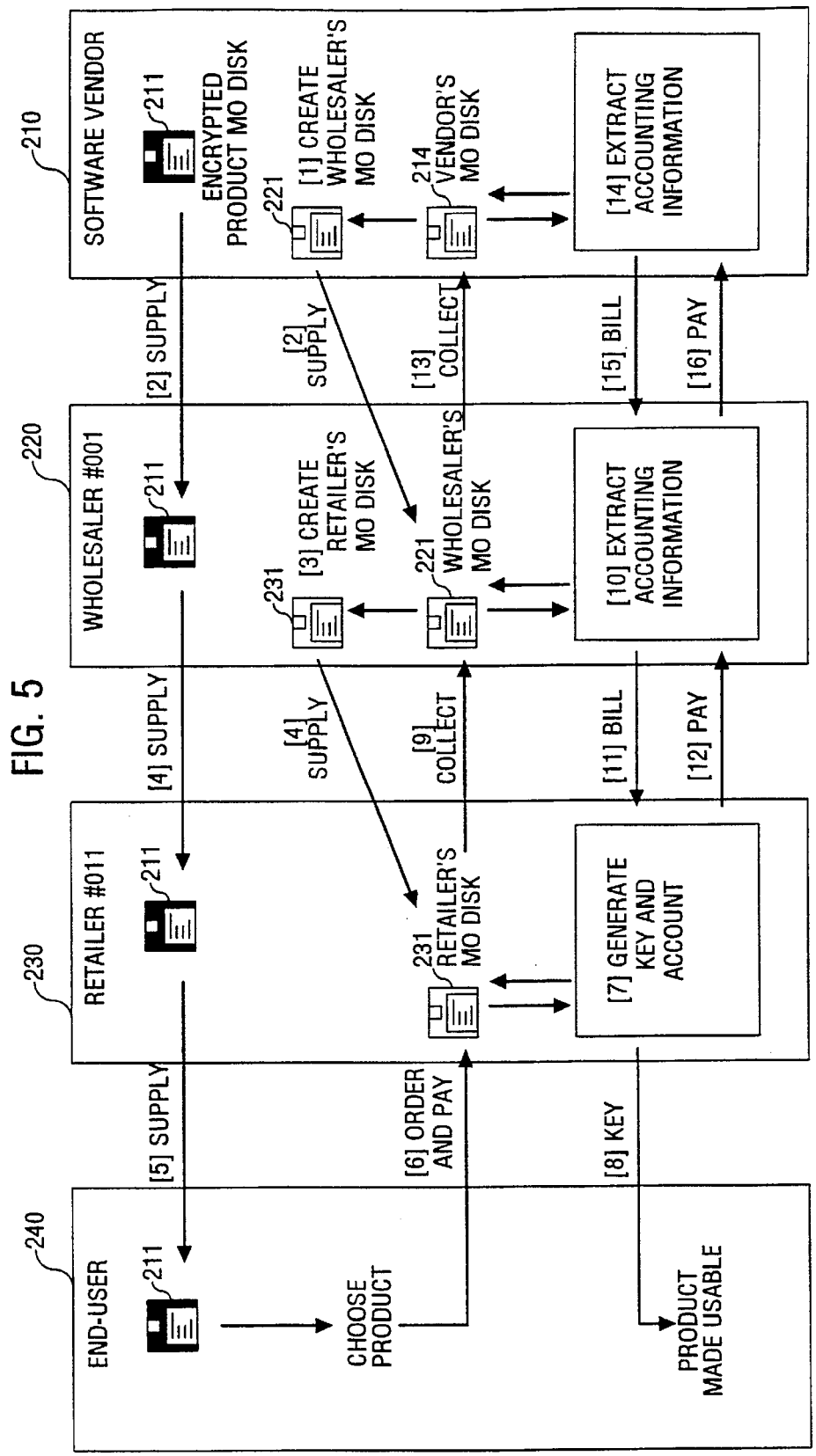
FIG. 5 illustrates a flow of media in the first embodiment of the present invention.

FIG. 5 more specifically illustrates a flow of media in the first embodiment of the present invention.

The storage media used in the system of FIG. 5 are MO (Magneto-Optical) disks, which are re-writable while CD-ROMs are read-only. Product MO disk, wholesaler's MO disk and retailer's MO disk are equivalent to what have been so far referred to as product medium, wholesaler's sales-medium and retailer's sales-medium, respectively. The following explanation proceeds along the flow of the storage media.

[1] The software vendor 210 creates a wholesaler's MO disk 221 duplicating from a vendor's MO disk 214 for the software vendor itself. The details about how to create this wholesaler's MO disk 221 will be described later with reference to FIGS. 6(A) and 6(B).

[2] The software vendor 210 supplies the wholesaler 220 with a product MO disk 211 which stores a plurality of encrypted software products and the wholesaler's MO disk 221 created in [1]. At this stage the medium identifier may be affixed to the product MO disk 211 when it is required (not shown in FIG. 5).

[3] A retailer's MO disk 231 is created according to the wholesaler's MO disk 221. The details about how to create this retailer's MO disk 231 will be described later with reference to FIGS. 6(A) and 6(C). Incidentally, in case that there is another wholesaler between the wholesaler 220 and the retailer 230, the wholesaler 220 carries out the same operations as in [2].

[4] The wholesaler 220 supplies the retailer 230 with the product MO disk 211 and the retailer's MO disk 231.

[5] The retailer 230 supplies the end-user 240 with the product MO disk 211. At this stage the system-user identifier may be affixed to the product MO disk 211 when it is required (not shown in FIG. 5).

[6] The end-user 240 chooses a product out of the encrypted software products in the product MO disk 211. The end-user 240 then orders it to the retailer 230 and pays for it.

[7] In response to the payment, the retailer 230 extracts a decryption key which is associated with the product name specified by the end-user, from the retailer's MO disk 231. The retailer 230 then generates a complex key from the decryption key just extracted and the medium identifier, the user-unit identifier, or the system-user identifier. At the same time, the sales record for the sold product is automatically updated by increasing the count by one.

[8] The retailer 230 hands over the generated complex key to the end-user 240. The end-user 240 then extracts the decryption key from the complex key by using the medium identifier, the user-unit identifier, or the system-user identifier. The decryption key allows the end-user 240 to decrypt the software product in the product MO disk 211 back to an executable form.

[9] The retailer 230 periodically collects the retailer's MO disk 231 (e.g., on the last day of monthly accounting cycle—i.e., the month-end).

[10] The wholesaler 220 extracts the accounting information stored in the collected retailer's MO disk 231 and calculates the sales track record per product by summing up such sales records of all the affiliated retailers.

[11] According to thus calculated sales track record, the wholesaler 220 bills the retailer 230.

[12] The retailer 230 makes a payment for the bill.

[13] The software vendor 210 periodically collects the wholesaler's MO disk 221 just in the same way as the wholesaler 220 does.

[14] The software vendor 210 extracts the accounting information stored in the collected wholesaler's MO disk 221 and calculates the total sales track record per product by summing up such sales track records of all the affiliated wholesalers.

[15] According to thus calculated total sales track records, the software vendor 210 bills the wholesaler 220.

[16] The wholesaler 220 makes a payment for the bill.

Figure 6A:
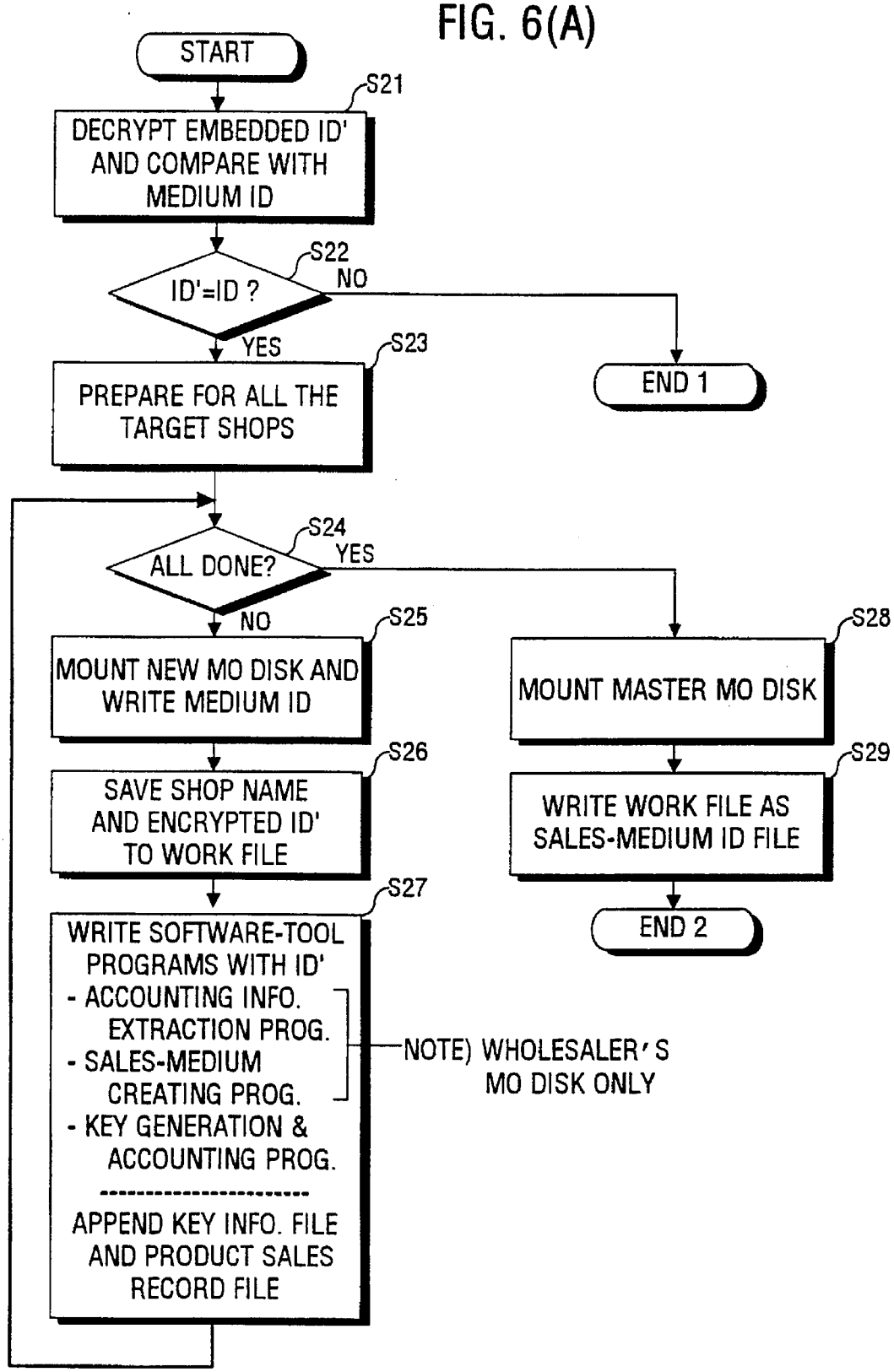
FIG. 6(A) is a flowchart showing a process to create MO disks for wholesalers and retailers.

FIG. 6(A) is a flowchart showing a process to create the wholesaler's MO disk and retailer's MO disk which appeared in FIG. 5.

This flowchart is common to both of those MO disks except for installation of two programs in Step S27 as noted "WHOLESALER'S MO DISK ONLY." The software vendor 210 and the wholesaler 220 have the vendor's MO disk 214 and the wholesaler's MO disk 221, respectively, and those disks will be referred to as their "master MO disks" in the following explanation for the purpose of common expression. Similarly, the downstream shop which will receive the MO disk as a sales-medium will be called as "target shop".

The process comprises the following steps.

[Step S21]
The medium creating program decrypts the identifier "ID'" embedded in itself using a decryption key in the program and compares it with the medium identifier "ID" stored as the shop information in the master disk.

[Step S22]
It is decided whether ID' agrees with ID or not. If yes, the shop is authorized and it is allowed to proceed to Step S23. If no, the shop turns out to be an unauthorized shop, and therefore, the process is terminated at END 1.

[Step S23]
The process prepares for the following steps to be repeated for all the target shops.

[Step S24]
It is decided whether the MO disks have been produced for all the target shops or not. If yes, the process exits from the loop and goes to Step S28. If no, the process proceeds to Step S25, the beginning of the loop.

[Step S25]
A new MO disk for the next target shop is mounted and the system-user identifier of this new target shop is written thereinto as a medium identifier ID. This ID is then encrypted into ID'.

[Step S26]
The name of the target shop in combination with its encrypted identifier ID' is appended to the work file which stores temporary data.

[Step S27]
The encrypted identifier ID' is embedded into the following programs and then the programs are transferred to the MO disk. Note that the first two programs are not transferred to the retailer's MO disk.

Accounting information extraction program (Wholesaler's MO disk only)

Sales-medium creating program (Wholesaler's MO disk only)

Key generation and accounting program

In addition to above programs, a key information file is written into the MO disk for the target shop. The MO disk will also have a product sales record file that is initialized to zeros and also encrypted so as to protect from unauthorized access.

The process then returns to Step S24 to loop for the next target shop.

[Step S28]
The master MO disk is mounted.

[Step S29]
The work file is appended to the master MO disk as a sales-medium ID file and then the process is successfully terminated at END 2.

As a result of above Steps S21 to S29, the wholesaler's sales-medium and retailer's sales-medium are created as shown in FIGS. 6(B) and 6(C), respectively, and the names and ID's are saved in the master MO disk.

FIG. 6(B) shows an example of the wholesaler's MO disk. The wholesaler's MO disk contains the following identifier, programs and files. They are equivalent to the elements shown in parentheses which were once described in the first and second conceptual views in FIGS. 1 and 2.

Medium ID #1 (shop information)

Accounting information extraction program (accounting means)

Sales-medium creating programs (wholesaler's/retailer's sales-medium creating means)

Key generation and accounting program (key generating means and retailer accounting means)

Key information file (product information)
Product sales record file (Product information)
Sales-medium ID file The sales-medium ID file stores the names and the medium identifiers (i.e., the shop information) of the downstream shops.

FIG. 6(C) shows an example of the retailer's MO disk, which contains the following identifier, programs and files. Equivalent elements are shown in parentheses.

Medium ID #3 (shop information)
Key generation and accounting program (key generating means and retailer accounting means)
Key information file (product information)
Product sales record file (Product information)

Next, the details of the key generation and accounting process in the retailer 230 will be described below with reference to FIGS. 7(A) and 7(B).

Figure 7A:
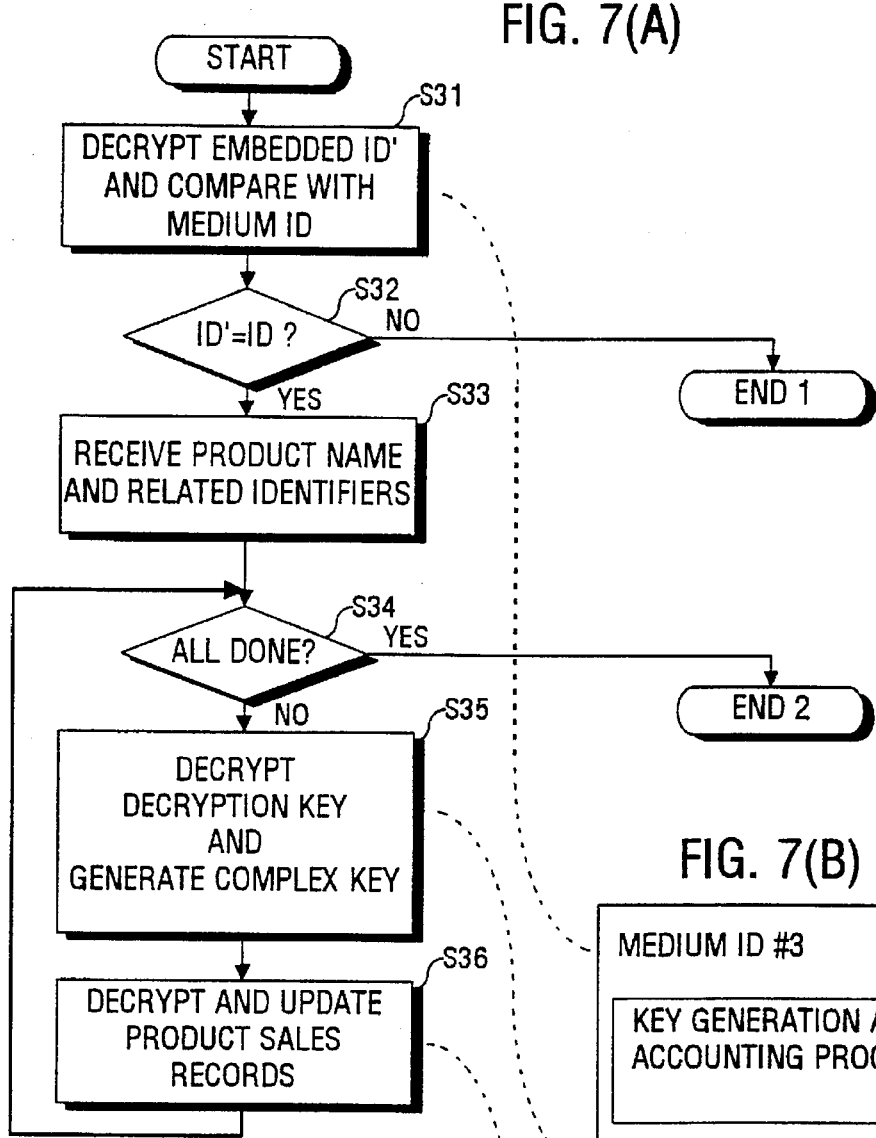
FIG. 7(A) is a flow chart showing a process in retailers to generate a decryption key and record sales transactions.

FIG. 7(A) is a flowchart showing a process in the retailer 230 to generate a decryption key and carry out accounting operations as described in [7] of FIG. 5. The process comprises the following steps.

[Step S31]

The key generation and accounting program decrypts the identifier "ID'" embedded in itself using a decryption key in the program and compares it with the medium identifier "ID".

[Step S32]

It is decided whether ID' agrees with ID or not. If yes, the retailer is authorized and it is allowed to proceed to Step S33. If no, the retailer turns out to be an unauthorized shop, and therefore, the process is terminated at END 1.

[Step S33]

On reception of the medium identifier, user-unit identifier, or system-user identifier (shop number) from the end-user 240, the process prepares for the following steps to be repeated for all the software products the end-user 240 has ordered.

[Step S34]

It is decided whether the key generation has been finished for all the ordered software products or not. If yes, the process exits from the loop and is terminated at END 2. If no, the process proceeds to Step S35, the beginning of the loop.

[Step S35]

The retailer 230 generates a complex key combining a decryption key, which is extracted and decrypted from the retailer's MO disk 231, and the identifiers informed from the end-user 240 (i.e., medium identifier, user-unit identifier, or system-user identifier). Then the retailer 230 supplies the complex key to the end-user 240.

[Step S36]

The sales record in the product sales record file is decrypted and then increased by one. The result is encrypted again and stored back to the file. The process returns to Step S34 for the next product.

Through the above-described steps, the complex key is generated for each software product ordered by the end-user and the sales record is simultaneously updated.

Figure 7B:
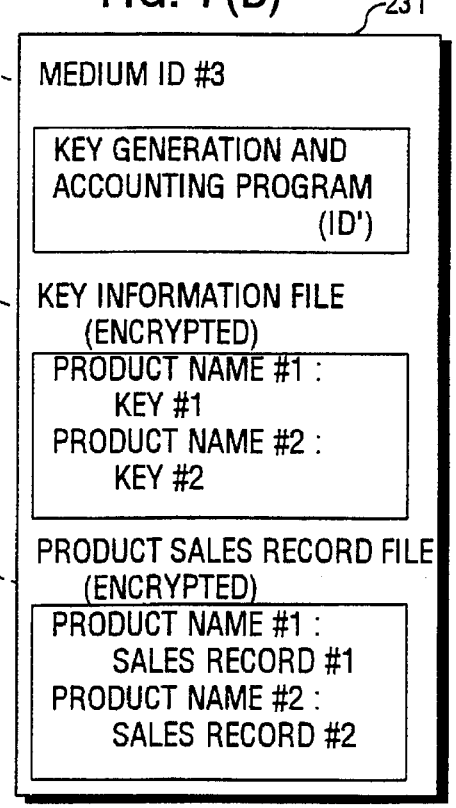
FIG. 7(B) illustrates the detailed contents of the retailer's MO disk.

FIG. 7(B) illustrates the detailed contents of the retailer's MO disk 231. The retailer's MO disk 231 contains the following identifier, programs and files. They are equivalent to the elements shown in parentheses which were once described in the first and second conceptual views in FIGS. 1 and 2.

Medium ID #3 (shop information)
Key generation and accounting program (key generating means, retailer's accounting means)
Key information file (encrypted) (product information)
product name #1: key #1
product name #2: key #2
Product sales record file (encrypted) (product information)
product name #1: sales record #1
product name #2: sales record #2

The correspondence between those contents and the process flow is indicated by the doted lines drawn between FIGS. 7(A) and 7(B).

Figure 8A:
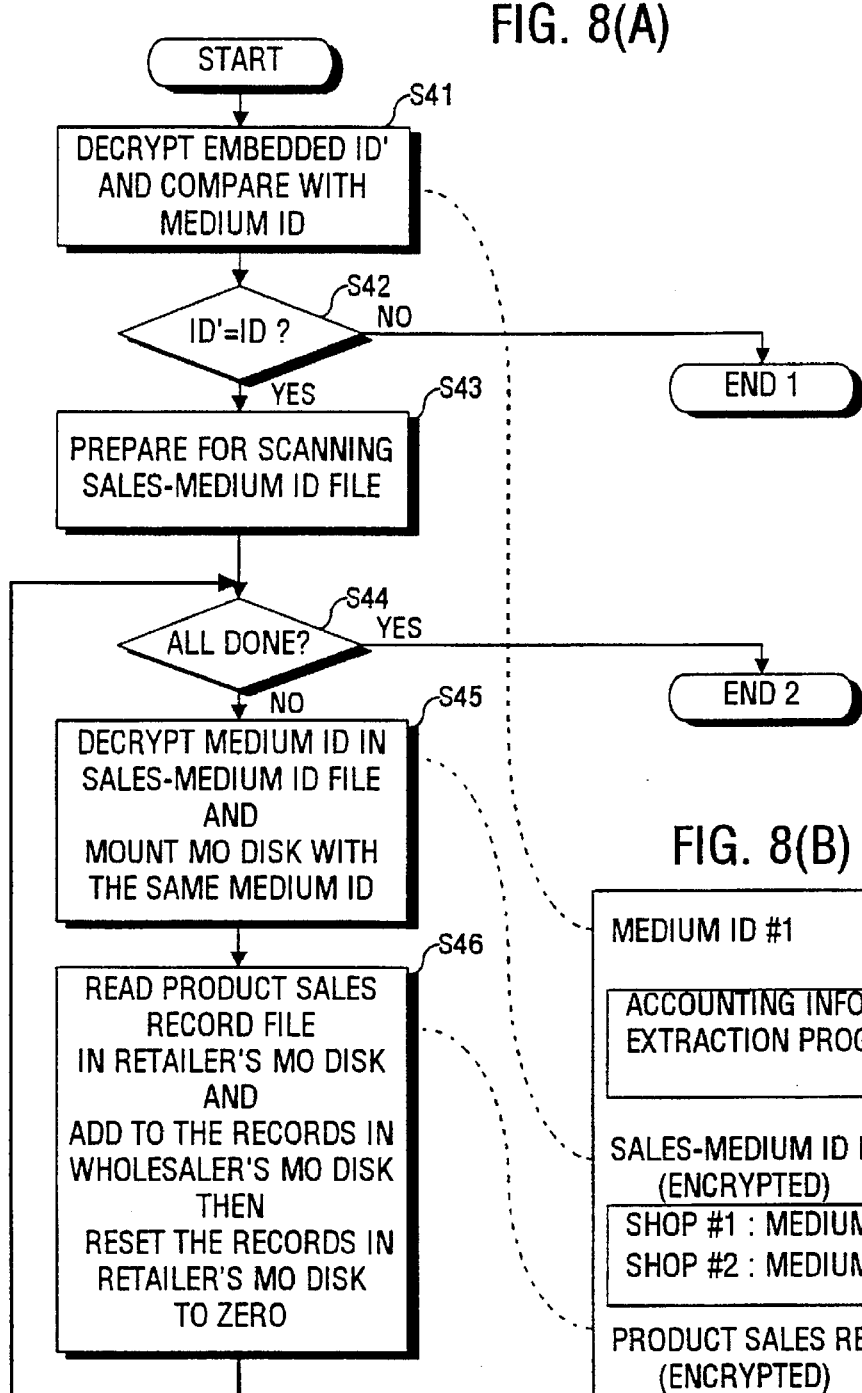
FIG. 8(A) is a flow chart showing a process to extract accounting information.
Figure 8B:
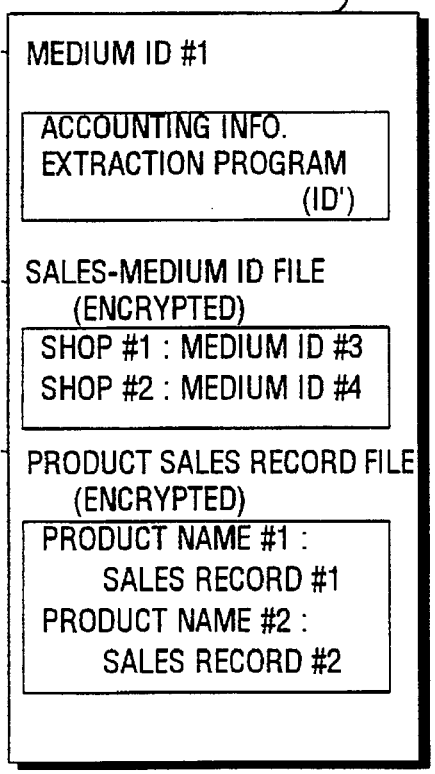
FIG. 8(B) illustrates the detailed contents of the wholesaler's MO disk.

The following describes the details of the extraction of accounting information with reference to FIGS. 8(A) and 8(B).

FIG. 8(A) is a flowchart showing a process to be carried out in the wholesaler 220 or the software vendor to extract accounting information as described in [10] and [14] of FIG. 5. The process comprises the following steps.

[Step S41]

The accounting information extraction program decrypts the identifier "ID'" embedded in itself using a decryption key in the program and compares it with the medium identifier "ID".

[Step S42]

It is decided whether ID' agrees with ID or not. If yes, the wholesaler is authorized and it is allowed to proceed to Step S43. If no, the wholesaler turns out to be an unauthorized shop, and therefore, the process is terminated at END 1.

[Step S43]

In reference to the sales-medium ID table, the process prepares for the following steps to be repeated for all the shops listed.

[Step S44]

It is decided whether the extraction has been finished for all the shops or not. If yes, the process exits from the loop and is terminated at END 2. Otherwise, the process proceeds to Step S45, the beginning of the loop.

[Step S45]

The accounting information extraction program decrypts a medium ID listed in the sales-medium ID file using a key in the program and then mounts the retailer's MO disk which has the same medium ID.

[Step S46]

The product sales record file in the retailer's MO disk mounted in Step S45 is read out and decrypted. The decrypted figure is added to the record in wholesaler's MO disk, and then each sales record in the retailer's MO disk is reset to zero.

FIG. 8(B) illustrates the detailed contents of a wholesaler's MO disk 221.

Medium ID #1 (shop information)
Accounting information extraction program (wholesaler accounting means, vendor accounting means)
Sales-medium ID file (encrypted)
shop #1: medium ID #1
shop #2: medium ID #2
Product sales record file (encrypted) (product information)
product name #1: sales record #1
product name #2: sales record #2

The correspondence between those contents and the process flow is indicated by the doted lines drawn between FIGS. 8(A) and 8(B).

Next, the following will explain a second embodiment of the present invention, which specifically discloses a structural arrangement where a wholesaler attaches the shop information of each retailer to the product-media and supplies them to end-users via the retailers. The drawings related to this second embodiment are FIGS. 8(A), 8(B) and 9 through 13(B). Since FIGS. 8(A) and 8(B) are common to the first embodiment, their explanation is not repeated here.

Figure 9:
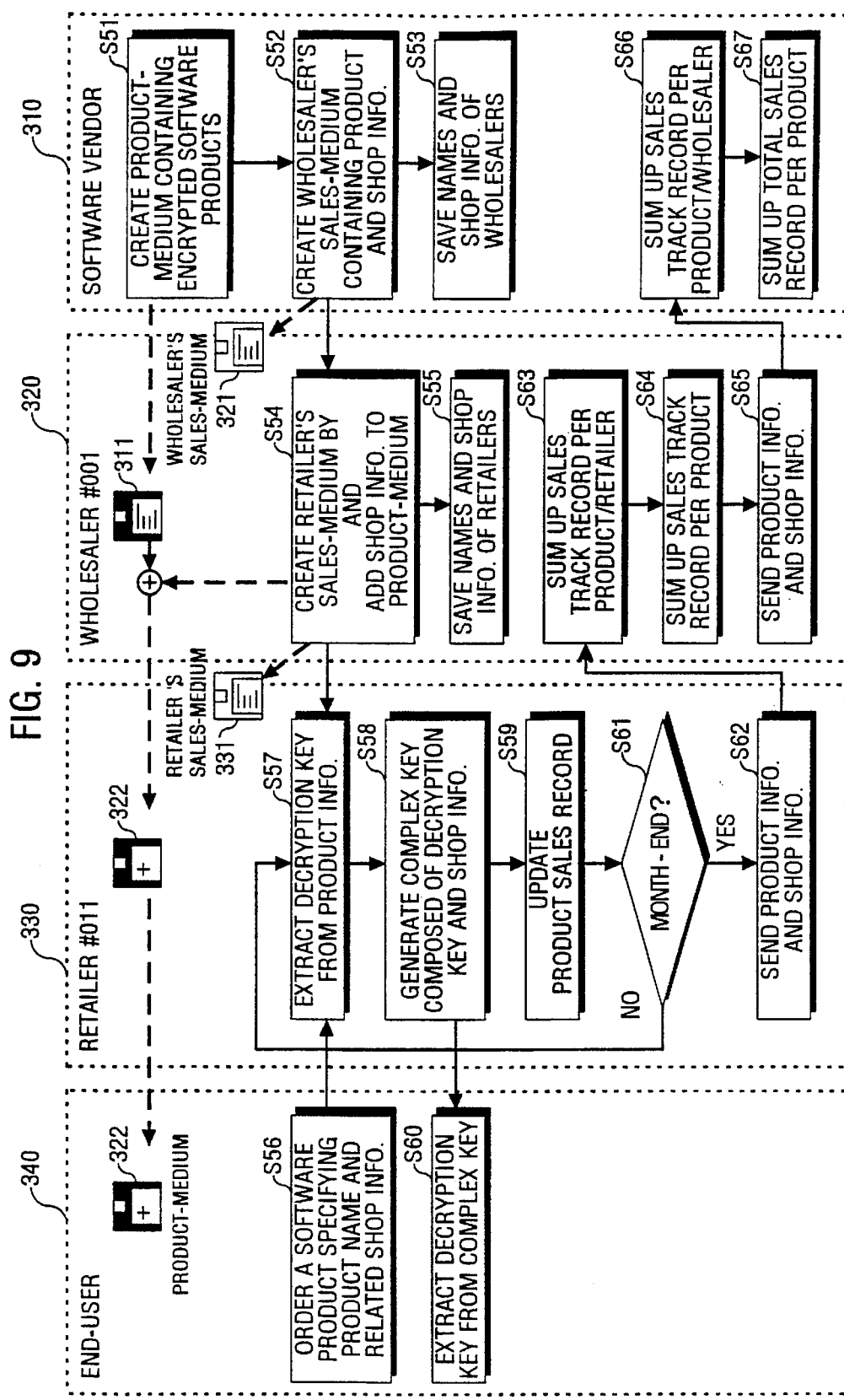
FIG. 9 shows a total process flow of a second embodiment.

FIG. 9 shows a system for licensing to use software products of the second embodiment.

A software vendor 310 actually is a software producer or a prime wholesaler which may have the exclusive right to sell the software products on behalf of the software producer. Being supplied with a product-medium 311 from this software vendor 310, a wholesaler 320 having a shop number #001 adds retailer's shop information to the product-medium 311 and distributes it as a product-medium 322 to the retailer 330. The retailer 330, which has a shop number #011, then supplies to the end-user 340 with the product-media and also provides decryption keys in response to the purchase orders from the end-users in exchange for the payment from them.

FIG. 9 explains the total process flow of the second embodiment with reference to the following steps S51 through S67.

[Step S51]
The software vendor encrypts a plurality of software products and packs those encrypted products into a product-medium 311, preferably an MO disk.

Figure 10A:
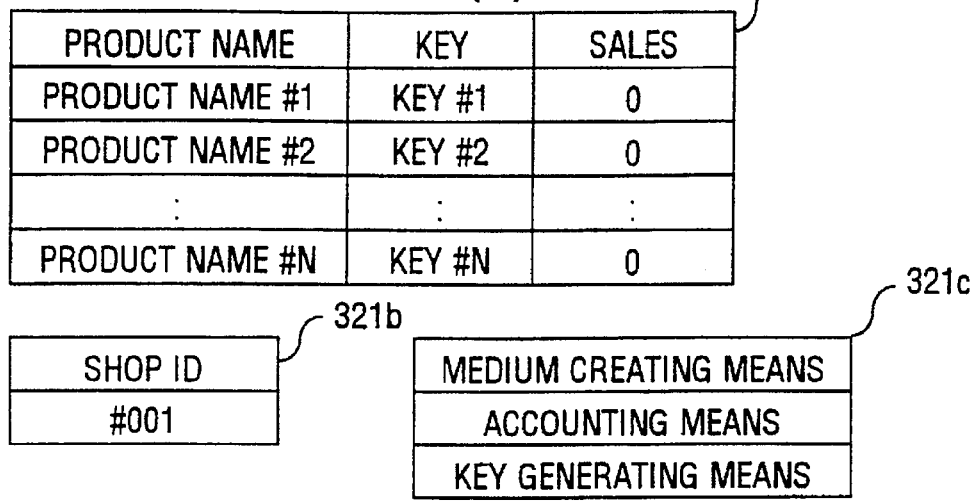
FIG. 10(A) illustrates contents of a wholesaler's sales-medium.

[Step S52]
Separately from the product-medium 311, the software vendor writes product information and shop information into a wholesaler's sales-medium 321 so as to provide data and tools for sales of the software products in the product-medium 311. The product information contains product names, decryption keys and sales record, and the shop information contains a wholesaler's identifier #001 as shown in FIG. 10(A). The sales-medium further contains programs for medium creating means, accounting means and key generating means.

[Step S53]
After creating the wholesaler's sales-medium 321, the software vendor 310 saves the name of wholesaler and the shop information for later use.

[Step S54]
Supplied with the wholesaler's sales-medium 321 from the software vendor 310, the wholesaler (#001) 320 copies the product information stored therein to a retailer's sales-medium 331 and then adds information concerning the downstream shops (i.e., retailers) to it. The wholesaler 320 also attaches the shop information (i.e., retailer's ID) to the product-medium 311. This modified product-medium 322 is sold to the end-user 340 via the retailer 330.

[Step S55]
The wholesaler #001 saves the name and shop information of the retailer for later use.

[Step S56]
The end-user 340 orders a product of his/her choice to the retailer 330 by informing them of its product name as well as the shop information (i.e., retailer's identifier) attached to the product-medium 322.

[Step S57]
The retailer 330 compares the informed shop information with that stored in the retailer's sales-medium 331. If they agree with each other, the retailer 330 extracts a decryption key associated with the informed product name out of the product information stored in the sales-medium 331. Otherwise, the end-user 340 is told that it is not the retailer 330 who sold the product-medium 322 and the process is discontinued.

[Step S58]
The retailer 330 then generates a complex key from the decryption key extracted in Step S57 and the shop information in the product-medium 322, and supplies the complex key to the end-user 340.

[Step S59]
The sales record in the product information stored in the product-medium 322 is increased by one for updating the sales track record.

[Step S60]
The end-user 340 extracts the decryption key from the complex key using the shop information. This decryption key allows the end-user 340 to decrypt the software product in the product-medium 311 back to the original and usable form.

[Step S61]
At the retailer 330, the date is checked whether it is or not the day for month-end accounting. If it is not the day, it returns to Step S57 and waits for the next transaction.

[Step S62]
If it is the day, the product information and the shop information stored in the retailer's sales-medium 331 are sent on-line to the wholesaler 320 as a month-end report (or the retailer's sales-medium 331 is sent back to the wholesaler 320).

[Step S63]
The sales track record per product/retailer is calculated and reported on a monthly basis. That is, the accounting means in the wholesaler's sales-medium 321 sums up the number of sold products and reports detailed information on the sales of the month.

[Step S64]
The sales track record of each product for all the retailers is calculated and reported. That is, the accounting means further calculates the total sales of each product for all the retail shops based on the sales track record product/retailer calculated in Step S63.

[Step S65]
The wholesaler 320 sends the product information as well as the shop information to the software vendor. That is, the product information updated with the sales track record obtained in Step S64 and the shop information of the wholesaler 320 are sent on-line to the software vendor (or the wholesaler's sales-medium 321 is sent back to the software vendor 310).

[Step S66]
At the software vendor 310, the sales track record per product/wholesaler is calculated and reported on a monthly basis. That is, the accounting means sums up the number of sold products based on the product information and the shop information reported from the wholesaler 320 in Step 65.

[Step S67]
The total sales track record of each product for all the wholesalers is calculated and reported. That is, the summing-up means further calculates the total sales of each product at all the wholesalers based on the sales track record per product/wholesaler calculated in Step S66.

As described above in Steps S51 to S67, the system of the second embodiment allows the software vendor to distribute the sales information and tools by creating and sending the sales-medium to its downstream shops in a stepwise manner. The system also allows each retailer to provide decryption keys to end-users and to record and report the monthly sales automatically.

In contrast to the first embodiment, the second embodiment modifies the product-medium so that it will have the shop information, or the retailer's identifier. This enables the retailer to check if the product-medium is among those they sold or not, in response to an inquiry from the end-user who purchased the product.

Next, the details of the wholesaler's sales-medium 321, the retailer's sales-medium 331, and the product-medium 322 will be described below with reference to FIGS. 10(A), 10(B) and 10(C).

FIG. 10(A) illustrates contents of a wholesaler's sales-medium 321, which includes product information 321a, shop information 321b, and software tools 321c.

The product information 321a contains product names, keys, and sales records. The product names are identifiers to represent the names of software encrypted product. The keys are used for decrypting respective encrypted software products and each key is actually expressed as a sequence of numerals with a predetermined length, which sequence conforms to some standards such as the DES. The sales records, which are initialized to zeros as seen in FIG. 10(A), will be used to sum up the number of sold products.

FIG. 10(A) also illustrates the shop information 321b which contains the wholesaler's identifier #001. The shop information is defined as an identifier of the downstream shop that will use that sales-medium.

The software tools 321c consist of some programs which will serve as the medium creating means and the accounting means as well as the key generating means which is used by the retailers but not by the wholesalers.

As described above, the software vendor 310 creates the wholesaler's sales-medium 321 which includes the product information 321a, the shop information 321b, the programs for the medium creating means, the accounting means, and the key generating means. The software vendor creates such a sales-medium for every wholesaler.

Figure 10B:
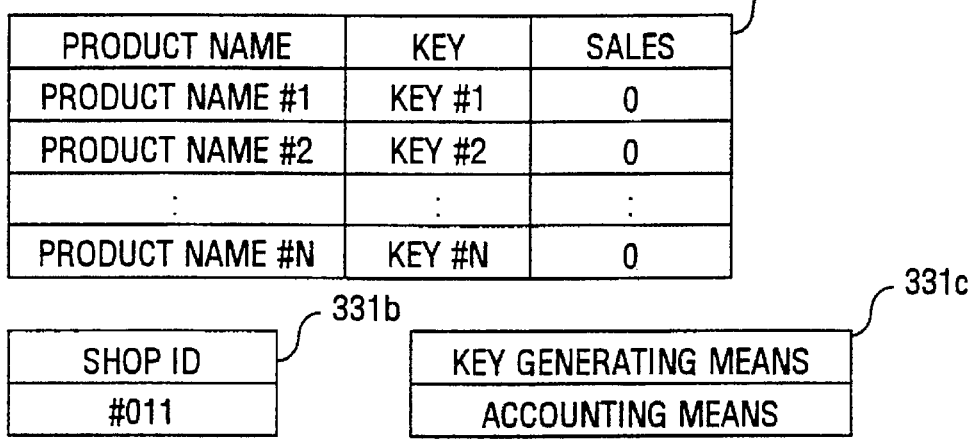
FIG. 10(B) illustrates contents of a retailer's sales-medium.

FIG. 10(B) illustrates contents of the retailer's sales-medium 331, which includes product information 331a, shop information 331b, and software tools 331c, just as FIG. 10(A).

The product information 331a is simply obtained by copying the product information 321a in the wholesaler's sales-medium 321, and therefore, they are identical to each other.

The shop information 331b contains the retailer's identifier #011 to be used to know which shop the specific sales-medium is assigned for.

The software tools 331c consist of some programs including at least accounting means and key generating means as shown in FIG. 10(B).

As described above, the wholesaler 320 creates the retailer's sales-medium 321 by copying the product information, the programs for the accounting means and the key generating means, and then adding the shop information of the retailer. The wholesaler 320 supplies this sales-medium 321 to every retailer.

Figure 10C:
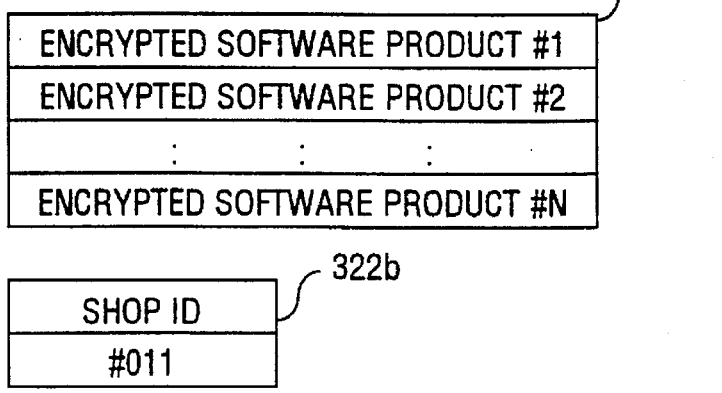
FIG. 10(C) illustrates contents of a product-medium to be sold by retailers.

FIG. 10(C) illustrates contents of the product-medium 322 which the retailer 330 deals in. The product-medium 322 contains files of encrypted software products #1 to #N, which are indicated by a reference numeral 322a, and a shop information 322b which holds the retailer's identifier to indicate which retailer sold that product-medium.

Figure 11:
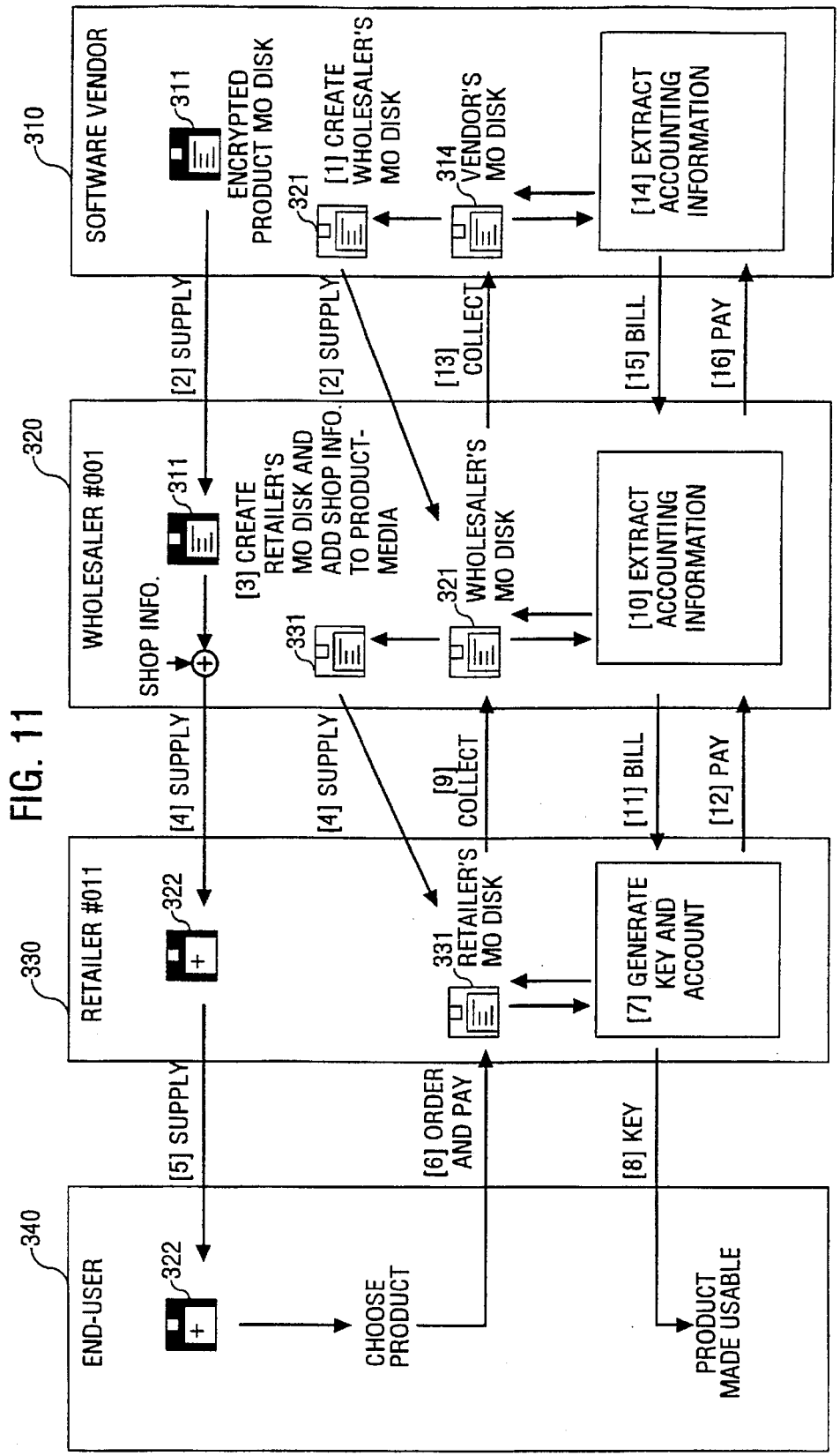
FIG. 11 illustrates a flow of media in the second embodiment of the present invention.

FIG. 11 specifically illustrates a flow of media in the second embodiment of the present invention.

The storage media used in the system of FIG. 11 are MO (Magneto-Optical) disks, which are re-writable while CD-ROMs are read-only. Product MO disk, wholesaler's MO disk and retailer's MO disk are equivalent to what have been so far referred to as product medium, wholesaler's sales-medium and retailer's sales-medium, respectively. The following explanation proceeds along the flow of the storage media.

[1] The software vendor 310 creates a wholesaler's MO disk 321 by duplicating a vendor's MO disk 314 for the software vendor. The details about this wholesaler's MO disk 321 will be described later with reference to FIGS. 12(A) and 12(B).

[2] The software vendor 310 supplies the wholesaler 320 with the wholesaler's MO disk 321 created in [1] and a product MO disk 311 which stores a plurality of encrypted software products. At this stage a medium identifier may be affixed to the product MO disk 311 when it is required (not shown in FIG. 11).

[3] The wholesaler 320 creates a retailer's MO disk 331 based on the wholesaler's MO disk 321 and a product-medium 322 by adding the shop information of the retailer to the product-medium 311. The details about how to create this retailer's MO disk 331 will be described later with reference to FIGS. 12(A) and 12(C). Incidentally, in case that there is another wholesaler between the wholesaler 320 and the retailer 330, the wholesaler 320 carries out the same operations as in [2].

[4] The wholesaler 320 supplies the retailer 330 with the product MO disk 322 and the retailer's MO disk 331.

[5] The retailer 330 supplies the end-user 340 with the product MO disk 322 which contains the encrypted software products and the shop information of the retailer 330.

[6] The end-user 340 chooses a product among the encrypted software products in the product MO disk 322. The end-user 340 then sends an order to the retailer 330 and pays for it as well as informing them of the shop information stored in his/her product-medium 322.

[7] In response to the payment, the retailer 330 extracts a decryption key which is associated with the product name specified by the end-user, from the retailer's MO disk 331. The retailer 330 then generates a complex key from the decryption key just extracted and the shop information in the retailer's sales-medium 331. At the same time, the sales record for the sold product is automatically updated by increasing the count by one.

[8] The retailer 330 hands over the generated complex key to the end-user 340. The end-user 340 then extracts the decryption key from the complex key by using the shop information. The decryption key allows the end-user 340 to decrypt the software product in the product MO disk 311 and obtain an executable program.

[9] The retailer 330 periodically collects the retailer's MO disk 331 (e.g., on the last day of monthly accounting cycle—i.e., the month-end).

[10] The wholesaler 320 extracts the accounting information stored in the collected retailer's MO disk 331 and calculates the sales track record per product by summing up such sales records of all the affiliated retailers.

[11] According to thus calculated sales track record, the wholesaler 320 bills the retailer 330.

[12] The retailer 330 makes a payment for the bill.

[13] The software vendor 310 periodically collects the wholesaler's MO disk 321 just in the same way as the wholesaler 320 does.

[14] The software vendor 310 extracts the accounting information stored in the collected wholesaler's MO disk 321 and calculates the total sales track record per product by summing up such sales track records of all the affiliated wholesalers.

[15] According to thus calculated total sales track records, the software vendor 310 bills the wholesaler 320.

[16] The wholesaler 320 makes a payment for the bill.

Figure 12A:
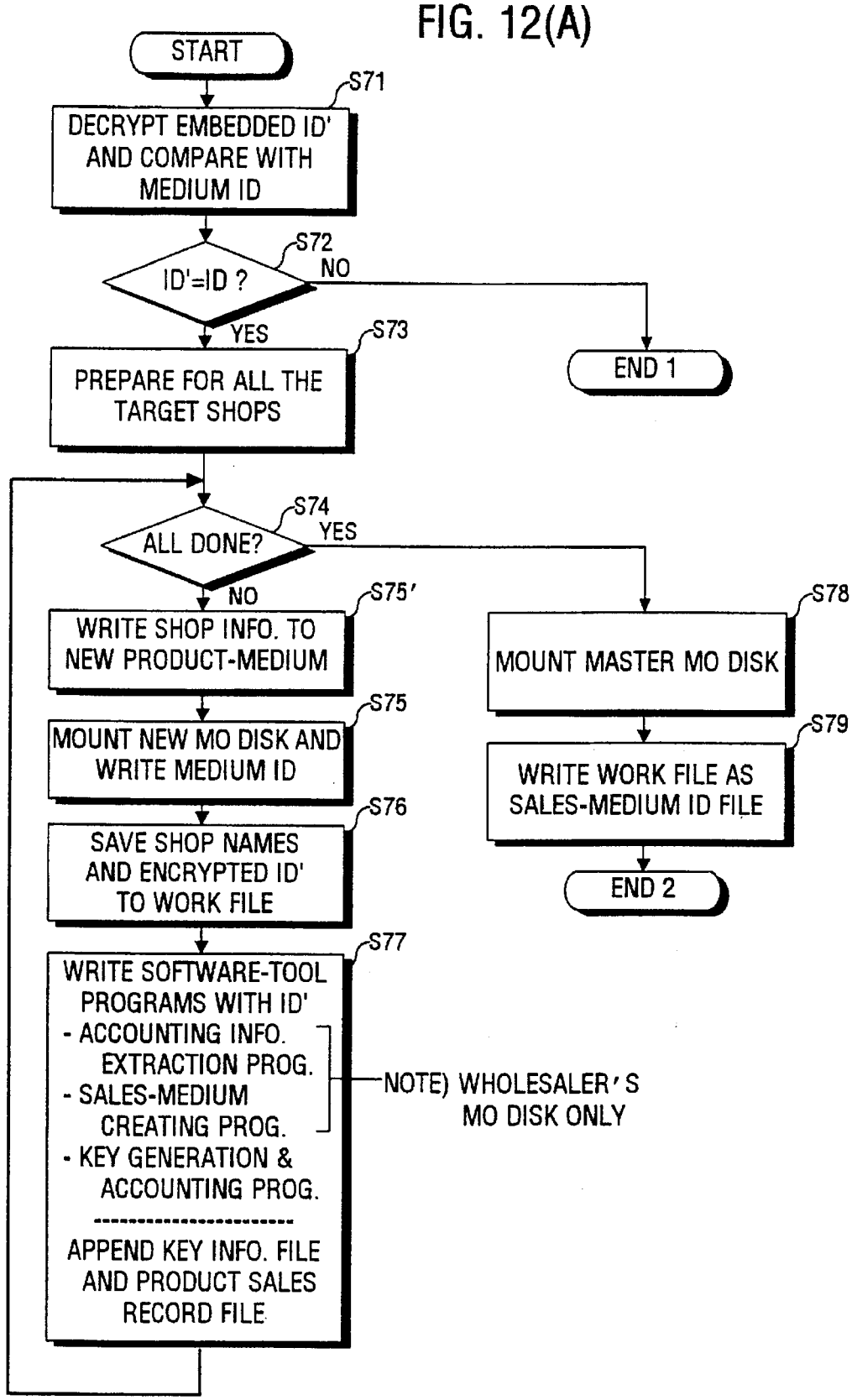
FIG. 12(A) is a flowchart showing a process to create MO disks for wholesalers and retailers.
Figure 14:
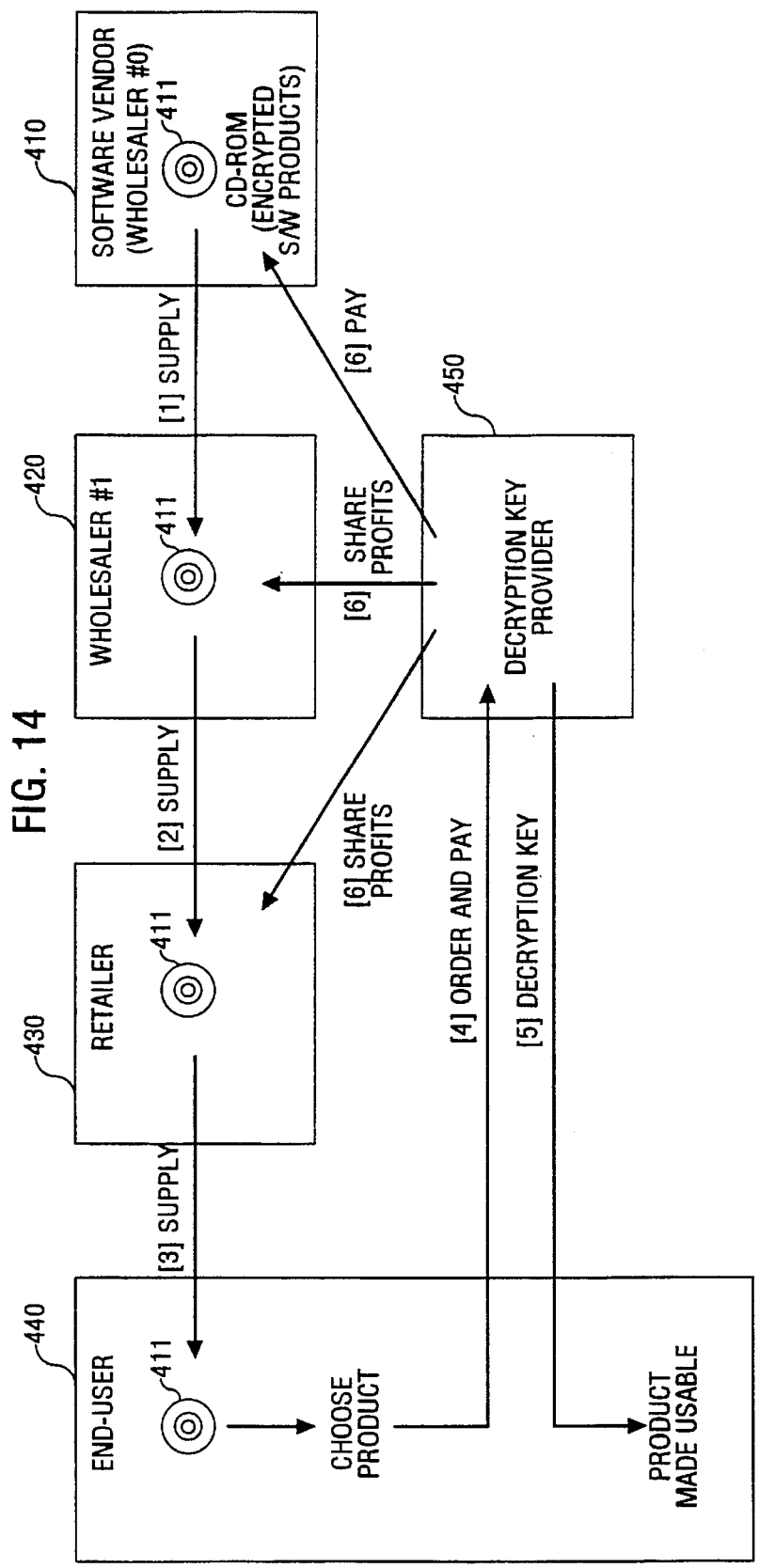
FIG. 14 shows a conventional system for licensing to use software products.

FIG. 12(A) is a flowchart showing a process to create the wholesaler's MO disk 321 and retailer's MO disk 331 which appeared in [1] and [3] of FIG. 11.

This flowchart is common to both of those MO disks except for installation of two programs in Step S77 as noted "WHOLESALER'S MO DISK ONLY." The software vendor 310 and the wholesaler 320 have the vendor's MO disk 314 and the wholesaler's MO disk 321, respectively, and those disks will be referred to as their "master MO disks" in the following explanation for the purpose of common expression. Similarly, the downstream shops which will receive the MO disk as a sales-medium will be called as "target shops."

The process comprises the following steps.

[Step S71]

The medium creating program decrypts the identifier "ID'" embedded in itself using a decryption key in the program and compares it with the medium identifier "ID" stored as the shop information in the master disk.

[Step S72]

It is decided whether ID' agrees with ID or not. If yes, the shop is authorized and it is allowed to proceed to Step S73. If no, the shop turns out to be an unauthorized shop, and therefore, the process is terminated at END 1.

[Step S73]

The process prepares for the following steps to be repeated for all the target shops.

[Step S74]

It is checked whether the MO disks have been produced for all the target shops or not. If yes, the process exits from the loop and goes to Step S78. If no, the process proceeds to Step S75.

[Step S75']

The shop information is written to all the product-media (product MO disks) for the next target shops as a medium identifier.

[Step S75]

A new MO disk is mounted for the next target shop and the shop information is written thereinto as a medium identifier ID. This ID is then encrypted into ID'.

[Step S76]

The name of the target shop in combination with its encrypted identifier ID' is appended to the work file which stores temporary data.

[Step S77]

The encrypted identifier ID' is embedded into the following programs and then the programs are transferred to the MO disk. Note that the first two programs are not transferred to the retailer's MO disk.

Accounting information extraction program (Wholesaler's MO disk only)

Sales-medium creating program (Wholesaler's MO disk only)

Key generation and accounting program

In addition to the above programs, a key information file is written into the MO disk for the target shop. The MO disk will also have a product sales record file that is initialized to zeros and also encrypted so as to protect from unauthorized access.

The process then returns to Step S74 to loop for the next target shop.

[Step S78]

The master MO disk is mounted.

[Step S79]

The work file is appended to the master MO disk as a sales-medium ID file and then the process is successfully terminated at END 2.

As a result of above Steps S71 to S79, the wholesaler's sales-medium and retailer's sales-medium are created as shown in FIGS. 12(B) and 12(C), respectively, and the names and ID's are saved in the master MO disk.

FIG. 12(B) shows an example of the wholesaler's MO disk. The wholesaler's MO disk contains the following identifier, programs and files. They are equivalent to the elements shown in parentheses which were once described in the first and second conceptual views in FIGS. 1 and 2.

Medium ID #1 (shop information)

Accounting information extraction program (accounting means)

Sales-medium creating programs (wholesaler's/retailer's sales-medium creating means)

Key generation and accounting program (key generating means and retailer accounting means)

Key information file (product information)

Product sales record file (Product information)

Sales-medium ID file

The sales-medium ID file stores the names and the medium identifiers (i.e., the shop information) of the downstream shops.

FIG. 12(C) shows an example of the retailer's MO disk, which contains the following identifier, programs and files. Equivalent elements are shown in parentheses.

Medium ID #3 (shop information)

Key generation and accounting program (key generating means and retailer accounting means)

Key information file (product information)

Product sales record file (Product information)

FIG. 12(D) shows an example of the product-medium (product MO disk) 322 which the retailer 330 supplies to the end-user 340. The product-medium 322 contains a medium identifier and a plurality of encrypted software products #1 to #N. The medium identifier is what is written in Step S75' of FIG. 12(A), and it indicates which retailer sold that product-medium.

Next, the details of the key generation and accounting process in the retailer 330 will be described below with reference to FIGS. 13(A) and 13(B).

FIG. 13(A) is a flowchart showing a process in the retailer 330 to generate a complex key and carry out accounting operations as described in [7] of FIG. 11. The process comprises the following steps.

[Step S81]

The key generation and accounting program decrypts the identifier "ID'" embedded in itself using a decryption key in the program and compares it with the medium identifier "ID".

[Step S82]

It is decided whether ID' agrees with ID or not. If yes, the retailer is authorized and it is allowed to proceed to Step S83. If no, the retailer turns out to be an unauthorized shop, and therefore, the process is terminated at END 1.

[Step S83]

The process receives product names and the medium identifier (shop information) from the end-user 340.

[Step S84]

The process checks whether the received medium identifier agrees with the medium identifier recorded in the retailer's sales-medium 331. If they agree with each other, the process prepares for the following steps to be repeated for all the software products the end-user 340 has ordered. Otherwise, the process is terminated at END 1.

[Step S85]

It is decided whether the key generation has been finished or not for all the ordered software products. If yes, the process exits from the loop and is terminated at END 2. If no, the process proceeds to Step S86.

[Step S86]

The retailer 330 generates a complex key combining a decryption key, which is extracted and decrypted from the retailer's MO disk 331, and the medium identifier informed from the end-user 340. Then the retailer 330 supplies the complex key to the end-user 340.

[Step S87]

The sales record in the product sales record file is decrypted and then increased by one. The result is encrypted again and stored back to the file. Then the process returns to Step S85 for the next product.

Through the above-described steps, the complex key is generated for each software product ordered by the end-user and the sales record is simultaneously updated.

FIG. 13(B) illustrates the detailed contents of the retailer's MO disk 331. The retailer's MO disk 331 contains the following identifier, programs and files. They are equivalent to the elements shown in parentheses which were once described in the first and second conceptual views in FIGS. 1 and 2.

Medium ID #3 (shop information)
Key generation and accounting program (key generating means, retailer accounting means)
Key information file (encrypted) (product information)
  product name #1: key #1
  product name #2: key #2
Product sales record file (encrypted) (product information)
  product name #1: sales record #1
  product name #2: sales record #2

The correspondence between those contents and the process flow is indicated by the doted lines drawn between FIGS. 13(A) and 13(B).

According to the above-described first and second embodiments, the product-medium will be delivered to the end-user with additional information such as a medium identifier or shop information, if required. The end-user informs the retailer of one or more of the medium identifier, the shop information (e.g., shop number and system-user identifier) and the user-unit identifier and they are used to generate the complex key being combined with the decryption key for the software product. The end-user receives this complex key and extracts the original decryption key from it by using the above identifiers or shop information, thereby decrypting the product-medium to obtain the original software product that is executable on his/her computer system.

When the retailer extracts the decryption keys associated with the software products, the software routine for extraction is initiated by entering the aforementioned identifiers and/or shop information, or modified so that it can be successfully initiated.

The keys are normally encrypted and stored in the sales-medium in a form of bit sequence, and another key to decrypt those keys is embedded in another routine in a separate place. For extraction of the keys from the bit sequence, this routine should be executed to obtain the another key to decrypt the keys.

Lastly, the present invention described above will be summarized below.

According to the present invention, a plurality of encrypted software products are packed in a product-medium and supplied to end-users via wholesalers and retailers. At the same time, a sales-medium containing product information and shop information is prepared for each wholesaler and retailer and delivered to them. In exchange for the payment from an end-user, the retailer extracts decryption keys and generates complex keys so that the end-user will use them to decrypt the software products which they purchased. In each transaction, the sales records are automatically updated, and they are summed up on every month-end for accounting operations. The sales-medium in a retailer or wholesaler is sent to the next-ranked upstream shop. The sales track records are calculated in a stepwise manner passing from retailer to wholesalers.

Such a system structure allows sales of encrypted and packed software products on a piece-by-piece basis and also enables each shop to perform accounting operations with accuracy of billing and payment. This results in the following advantages.

(1) Just as other normal products, the retailer can perfectly manage the encrypted software products which the end-users have purchased.

(2) The retailer can provide the end-users with the keys immediately in exchange for the payment. The retailer is allowed to set retail prices based on their own strategy, as they do for other normal products.

(3) By fully using the shop information recorded in the product-medium and sales-medium, it is possible to set a restriction such that the end-users are allowed to buy the software products exclusively from the retailers where they obtained their product-media.

(4) It becomes possible to perform accurate billing and payment operations for the sold products by exchanging the sales-media between the software vendor, wholesalers and retailers.

(5) It becomes possible to maintain the security of business information. That is, the retailers keep the end-users' information; the wholesalers keep the retailers' information; the software vendor keeps the wholesalers' information.

(6) It becomes possible to secure the sales track record information. Since the product sales records are encrypted and authentication is implemented for their access, access to those information is restricted to those who have originated the records or the upstream shops ranked next to the originators. For example, the sales records in a retailer can be decrypted or summed up only by the retailer itself or the wholesaler that the retailer is dealing with.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for licensing to use software products which are encrypted by a software vendor, the system comprising:

a first supplier unit for supplying a product-medium which contains a plurality of encrypted software products and a sales-medium, said first supplier comprising information storage means for storing key information and sales-medium creating means for creating the sales-medium which contains the key information stored in said information storage means; and a second supplier unit, being provided with the sales-medium from said first supplier unit, for supplying a key to decrypt one of the encrypted software products, said second supplier unit comprising key generating means for generating the key based on the key information which is supplied in the sales-medium.

2. A system according to claim 1, wherein said first supplier unit further comprises first accounting means for calculating total sales track records of the encrypted software products according to product sales records provided by said second supplier unit, and said second supplier unit further comprises second accounting means for calculating the product sales records of the encrypted software products whose keys have been generated in said second supplier unit.

3. A system for licensing to use software products which are encrypted by a software vendor, the system comprising:

a software vendor unit for supplying a product-medium which contains a plurality of encrypted software products and for supplying a wholesaler's sales-medium, said software vendor unit comprising
vendor information storage means for storing product information and wholesaler's name and
wholesaler's sales-medium creating means for creating the wholesaler's sales-medium based on the product information and the wholesaler's name stored in said information storage means;

a wholesaler unit for supplying a retailer's sales-medium which contains the product information and retailer's name, based on the wholesaler's sales-medium provided by said software vendor unit;

a retailer unit, being provided with the retailer's sales-medium from said wholesaler unit, for supplying an end-user with a key to decrypt one of the encrypted software products, said retailer unit comprising
key generating means for generating the key based on the product information stored in the retailer's sales-medium.

4. A system according to claim 3, wherein said retailer unit further comprises retailer accounting means for calculating retailer's sales track records of the encrypted software products whose keys have been generated in said retailer unit.

5. A system according to claim 4, wherein said wholesaler unit further comprises wholesaler accounting means for calculating wholesaler's sales track records according to the retailer's sales track records provided from said retailer unit.

6. A system according to claim 5, wherein said software vendor unit further comprises vendor accounting means for calculating total sales track records according to the wholesaler's sales track records provided from said wholesaler unit.

7. A system according to claim 3, wherein said product information includes
key information which provides a decryption key for each of the encrypted software products stored in the product-medium and
sales record to be used for recording how many times the key for each of the encrypted software products has been generated.

8. A system according to claim 3, wherein said key is a complex key which is composed of a decryption key for decrypting one of the encrypted software products and a key qualifier for qualifying the end-user to use the decryption key, and said key generating means requires an input of the key qualifier in prior to generating the complex key.

9. A system according to claim 8, wherein said key qualifier is a product identifier which identifies one of the encrypted software products.

10. A system according to claim 8, wherein said key qualifier is a medium identifier that identifies the product-medium.

11. A system according to claim 8, wherein said key qualifier is a user-unit identifier that identifies a user's unit on which the software products will run after decryption.

12. A system according to claim 8, wherein said key qualifier is a system-user identifier that identifies a user of the system.

13. A method of licensing to use software products which are encrypted by a software vendor and finally supplied to an end-user via a wholesaler and a retailer, the method comprising the steps of:

(a) supplying the end-user with a product-medium which contains a plurality of software products being encrypted;

(b) creating a wholesaler's sales-medium based on the product information and wholesaler's name;

(c) supplying the wholesaler's sales-medium to the wholesaler;

(d) creating a retailer's sales-medium which contains the product information and retailer's name, based on the wholesaler's sales-medium;

(e) supplying the retailer's sales-medium to the retailer; and (f) generating a key for the end-user to decrypt one of the encrypted software products based on the product information stored in the retailer's sales-medium.

14. A method according to claim 13, wherein said step (f) further counts transactions of generating the key for each of the software products, the method further comprising the steps of:

(g) calculating retailer's sales track records based on counts of the transactions counted in said step (f);

(h) calculating wholesaler's sales track records of the software products according to the retailer's sales track records obtained in said step (g); and (i) calculating total sales track records of the software products according to the wholesaler's sales track records obtained in said step (h).

15. A method according to claim 13, wherein said step (f) comprises the substeps of:

(f1) extracting a decryption key from the product information stored in the retailer's sales-medium;

(f2) receiving an input of a key qualifier for qualifying the end-user to use the decryption key;

(f3) composing the decryption key and the key qualifier; and (f4) outputting the key composed in said substep (f3).

* * * * *